US010963978B2

(12) United States Patent
Conlon

(10) Patent No.: US 10,963,978 B2
(45) Date of Patent: Mar. 30, 2021

(54) ENHANCED ALERT/NOTIFICATION SYSTEM FOR LAW ENFORCEMENT IDENTIFYING AND TRACKING OF STOLEN VEHICLES AND CARGO

(71) Applicant: Overhaul Group, inc., West Lake Hills, TX (US)

(72) Inventor: Barry Conlon, Leander, TX (US)

(73) Assignee: Overhaul Group, Inc., West Lake Hills, TX (US)

( * ) Notice: Subject to any disclaimer, the term of this patent is extended or adjusted under 35 U.S.C. 154(b) by 45 days.

(21) Appl. No.: 16/157,083

(22) Filed: Oct. 10, 2018

(65) Prior Publication Data

US 2019/0073735 A1 Mar. 7, 2019

Related U.S. Application Data

(63) Continuation-in-part of application No. 16/054,996, filed on Aug. 3, 2018, now Pat. No. 10,832,204.
(Continued)

(51) Int. Cl.
*G06Q 50/26* (2012.01)
*H04K 3/00* (2006.01)
(Continued)

(52) U.S. Cl.
CPC ......... *G06Q 50/265* (2013.01); *B60R 25/102* (2013.01); *B60R 25/33* (2013.01);
(Continued)

(58) Field of Classification Search
CPC ........ G06Q 10/00; G06Q 20/00; G06Q 30/00; G06Q 40/00; G06Q 50/265; G06Q 10/083;
(Continued)

(56) References Cited

U.S. PATENT DOCUMENTS 4,818,998 A   4/1989 Apsell et al.
6,842,774 B1   1/2005 Piccioni
(Continued)

OTHER PUBLICATIONS

Kilcarr, Sean, "Thwarting cargo theft while boosting efficiency through technology", Trade Journal, Overland Park, Jan. 30 (Year: 2013).*

(Continued)

*Primary Examiner* — Frantzy Poinvil
(74) *Attorney, Agent, or Firm* — Isidore PLLC

(57) ABSTRACT

A law enforcement (LE) data processing system (DPS) includes a processor that executes a LE security event notification and dispatch (SEND) utility. The LE DPS receives, from a tracking system communicatively coupled to the LE DPS, an enhanced security event notification (ESEN) that includes information identifying a security event, a location at which the security event occurred, and additional distinguishing details corresponding to entities involved in and affected by the security event. The LE DPS selectively transmits information from the updated ESEN to at least one LE dispatch server supporting LE personnel within one of (i) a geographic vicinity of the location of the security event and (ii) a calculated zone of recapture, the additional distinguishing details enabling the LE personnel to receive a more complete set of relevant details at a LE field device that enables more accurate identification, tracking, and resolution by LE personnel of the security event.

23 Claims, 20 Drawing Sheets

Related U.S. Application Data

(60) Provisional application No. 62/162,208, filed on May 15, 2015, provisional application No. 62/570,185, filed on Oct. 10, 2017.

(51) Int. Cl.

| | | |
|---|---|---|
| *B60R 25/33* | (2013.01) | |
| *G08B 13/22* | (2006.01) | |
| *B60R 25/102* | (2013.01) | |
| *G06Q 10/08* | (2012.01) | |
| *H04W 4/90* | (2018.01) | |
| *H04L 29/08* | (2006.01) | |
| *H04L 29/06* | (2006.01) | |
| *G06Q 50/30* | (2012.01) | |
| *H04W 12/00* | (2021.01) | |

(52) U.S. Cl.
CPC ......... *G06Q 10/0833* (2013.01); *G06Q 50/30* (2013.01); *G08B 13/22* (2013.01); *H04K 3/22* (2013.01); *H04L 63/302* (2013.01); *H04L 67/22* (2013.01); *H04W 4/90* (2018.02); *H04W 12/007* (2019.01)

(58) Field of Classification Search
CPC ...... G06Q 50/30; H04W 4/90; H04W 12/007; B60R 25/102; B60R 25/33; G08B 13/22; H04K 3/22; H04L 63/302; H04L 67/22
USPC ...................................................... 705/3–44
See application file for complete search history.

(56) References Cited

U.S. PATENT DOCUMENTS

| | | | | |
|---|---|---|---|---|
| 7,522,043 | B2* | 4/2009 | English | G06Q 10/08 340/431 |
| 7,714,708 | B2* | 5/2010 | Brackmann | B60P 3/14 340/539.1 |
| 7,825,803 | B2* | 11/2010 | Neff | G01S 13/08 340/572.1 |
| 8,164,458 | B2* | 4/2012 | Mostov | G06Q 10/08 340/10.1 |
| 8,428,913 | B2* | 4/2013 | Troxler | G01C 21/005 702/187 |
| 8,954,292 | B2* | 2/2015 | Troxler | G08B 21/0269 702/187 |
| 9,033,116 | B2* | 5/2015 | Breed | G08B 13/2417 188/82.7 |
| 2001/0030599 | A1* | 10/2001 | Zimmermann | B60R 25/1004 340/426.25 |
| 2004/0113783 | A1* | 6/2004 | Yagesh | G06Q 10/08 340/568.1 |
| 2005/0136912 | A1 | 6/2005 | Curatolo et al. | |
| 2007/0030169 | A1* | 2/2007 | McNay | G08G 1/202 340/932.2 |
| 2007/0188322 | A1* | 8/2007 | English | G06Q 10/08 340/539.26 |
| 2008/0303663 | A1* | 12/2008 | Smith | B01L 99/00 340/550 |
| 2013/0033381 | A1 | 2/2013 | Breed | |
| 2014/0202800 | A1* | 7/2014 | Breed | B60T 1/005 188/74 |
| 2014/0330737 | A1* | 11/2014 | Williams | G06Q 10/0833 705/333 |
| 2015/0111524 | A1 | 4/2015 | South | |
| 2015/0339902 | A1* | 11/2015 | Dom Nguez Latorre | G06Q 10/08 340/572.1 |
| 2016/0050356 | A1 | 2/2016 | Nalepka et al. | |
| 2017/0164176 | A1 | 6/2017 | Lieu | |

OTHER PUBLICATIONS

Patent Cooperation Treaty, International Search Report and Written Opinion, International Application No. PCT/US2018/055312, dated Dec. 14, 2018.

* cited by examiner

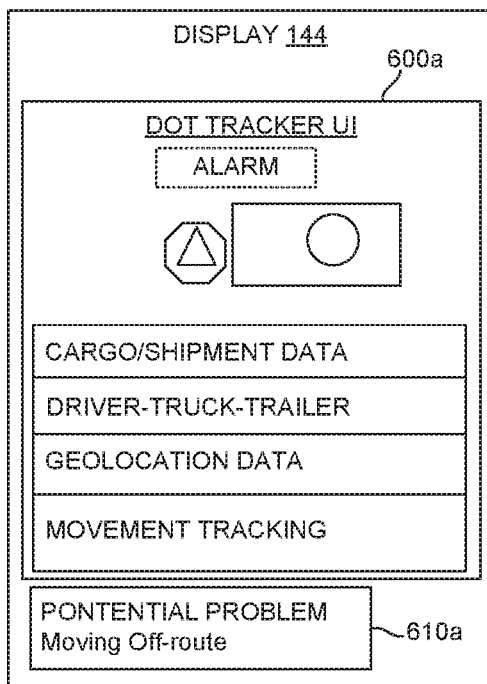
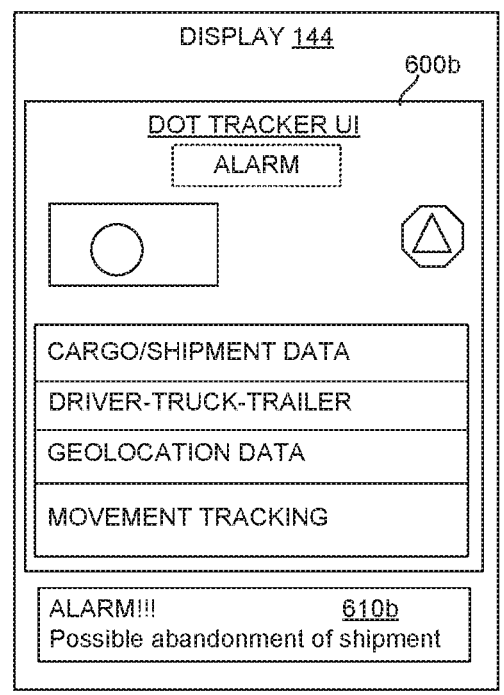
FIG. 6A  FIG. 6B
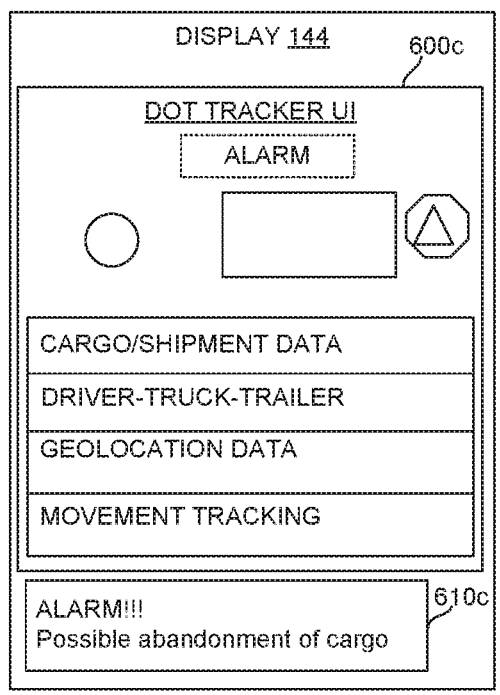
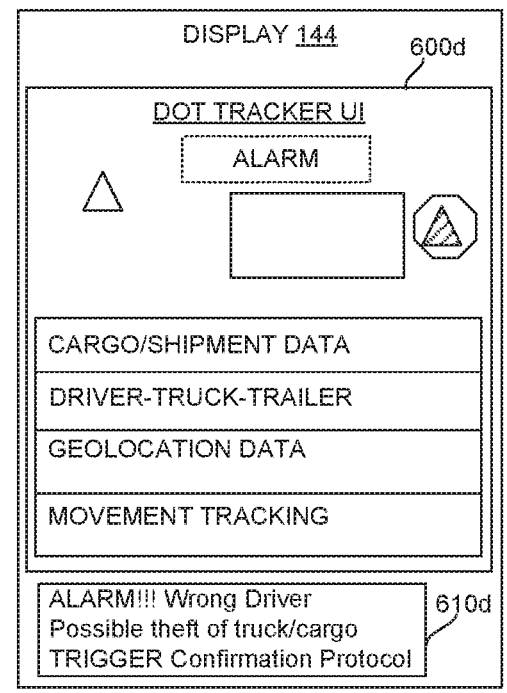
FIG. 6C  FIG. 6D

OPERATOR/DRIVER SHIPMENT TRACKING UI 1024

WELCOME BACK DRIVER,

PLEASE ENTER/UPDATE THE BELOW SHIPMENT DATA

SHIPMENT DETAILS 1092

- ENTER SPECIFICS OF SHIPMENT- CARGO MANIFEST
- CURRENT EQPTMNT LOCATION [CLICK TO CHANGE]
- ENTER PICKUP LOCATION AND TIME
- ENTER DESTINATION DETAILS

DRIVER/OPERATOR MOBILE DEVICE SETUP + DISTINGUISHING DATA 1094

- ENTER DRIVER ID AND LICENSE
- ENTER BIOMETRIC DATA OF DRIVER (FOR SECURITY USAGE -&/ OR THEFT EXCLUSION)
- ENTER DESCRIPTION OF DRIVER
- ENTER EQUIPMENT REGISTRATION DETAILS, VIN, LICENSE PLATE NUMBER, ETC.
- EDIT/ENTER SHIPPING RELATED DATA AND INFORMATION
- CAPTURE/UPLOAD PICTURE OF VEHICLE &/OR TRAILER
- ENTER DESCRIPTION OF VEHICLE/ EQUIPMENT
- CAPTURE/UPLOAD PICTURE OF CARGO
- CAPTURE/UPLOAD PICTURE/ DETAILS OF LOCK

SET PREFERENCES 1096

- *DOTS & NOTIFICATION PREFERENCES*
- *THEFT DETECTION RESPONSE/ NOTIFICATION PREFERENCES*

FIG. 10B

FIG. 14A
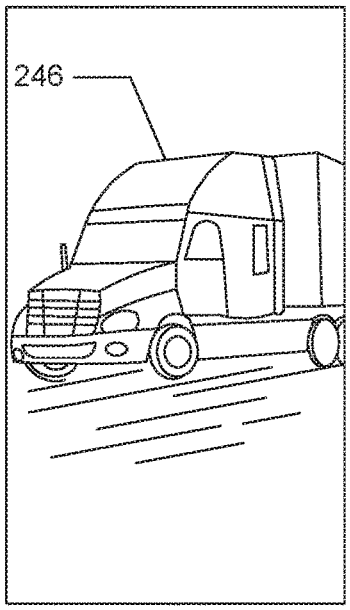
Picture Trailer
NW 25th St, Miami,
Florida
014/01/16 7:23 am EDT
FIG. 14B
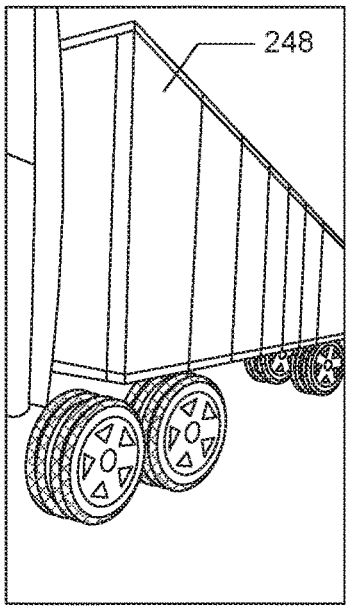
Picture Trailer
NW 25th St, Miami,
Florida
014/01/16 7:24 am EDT
FIG. 14E
1400
TRACTOR NUMBER
317
TRAILER NUMBER
5523
COLOR
Red
MAKE
Kenworth
MILEAGE
61392
VIN
1XKYDP9X14GJ110254
CHASSIS NUMBER
110254
SEAL NUMBER
114141445
MODEL NUMBER
T6140
FIG. 14C
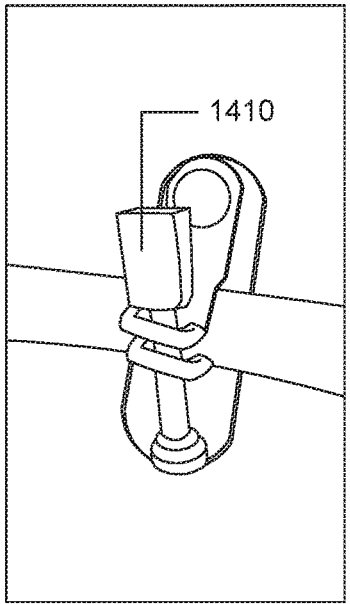
1410
Picture Lock on Trailer
NW 25th St, Miami,
Florida
014/01/16 7:24 am EDT
FIG. 14D
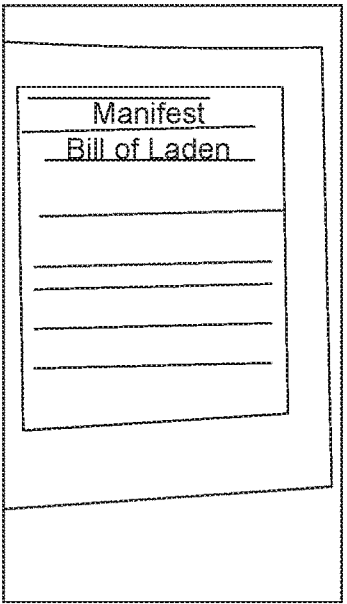
Picture Bill of Laden / Manifest
NW 25th St, Miami,
Florida
014/01/16 9:514 am EDT

ENHANCED ALERT/NOTIFICATION SYSTEM FOR LAW ENFORCEMENT IDENTIFYING AND TRACKING OF STOLEN VEHICLES AND CARGO

PRIORITY & RELATED APPLICATIONS

The present application is continuation-in-part of and claims priority from: U.S. Utility application Ser. No. 16/054,996, filed on Aug. 3, 2018, which in turn claims priority from U.S. Utility application Ser. No. 15/156,318, filed on May 16, 2016, now U.S. Pat. No. 10,832,204 with priority date (based on of U.S. provisional application No. 62/162,208) of May 15, 2015. The application is also a conversion of and claims priority to Provisional Application No. 62/570,185, filed on Oct. 10, 2017. The entire content of each related application from which the present application claims priority is incorporated herein by reference. Priority to both the utility applications and the provisional application is claimed for the corresponding sections of the present application disclosed in the respective priority applications.

BACKGROUND

1. Field of the Invention

The present disclosure is generally related to security systems and security processes related to trackable items susceptible to theft, and in particular to data processing systems and methods for providing enhanced security event notifications to law enforcement to enable more efficient tracking and identification of stolen items.

2. Description of the Related Art

Large quantities of cargo are transported daily across the continental US and in most other industrial countries, with transportation carriers. The use of tractor-trailers as cargo transport vehicles provided by the trucking industry accounts for a significant portion of the vehicles utilized to transport cargo. In the trucking industry, cargo is arranged to be transported from an origination point to a destination point via a particular tractor-trailer, driven by an operator/driver.

Each shipped cargo is valuable to the parties involved in the shipment transaction, from the shipper, the brokerage service, the trucker (or truck driver/operator), and the recipient. Thus, the security of the cargo once the cargo leaves the origination/shipping point is of concern. With conventional trucking, the security aspects of the cargo have been primarily based on the operator being diligent in the field as the tractor-trailer is moved along a selected delivery route.

Unfortunately, the value of these cargo and/or their transport vehicles can often be attractive to others who have no ownership or financial interest in the shipment, and those persons may desire to steal the cargo and/or the transport vehicle for various reasons, including financial or otherwise. Even a diligent operator is not be able to detect when activities are occurring in or around the shipment and the tractor-trailer or other transport vehicle that negatively affects the shipment and/or jeopardizes or prevents the completion of the shipment delivery.

Consequently, theft of cargo and/or transport vehicles carrying cargo frequently occurs. In the cargo shipment industry, for example, where large quantities of goods are transported daily across the continental US and in most other industrial countries using various different forms of transport vehicles, both the transport vehicles and the cargo being shipped are susceptible to theft while in route to the destination. The trucking industry, in particular, provides opportunities for both experienced and inexperienced thieves to abscond with an entire shipment of cargo and the tractor trailer itself, resulting in potentially tens or hundreds of thousands in loss from theft of a single transport vehicle.

SUMMARY

The illustrative embodiments of the present disclosure provide law enforcement (LE) data processing systems, LE field devices, shipment monitoring and security event notification systems, driver mobile communication devices, and associated methods for providing enhanced security event notifications to law enforcement to enable more efficient tracking, identification, and recovery of stolen items.

According to a first aspect, a law enforcement (LE) data processing system includes: a memory having stored thereon a LE security event notification and dispatch (SEND) utility that enables the LE DPS to generate and forward an updated enhanced security event notification (ESEN) to one or more LE dispatch servers for forwarding to LE field devices of LE personnel. The LE DPS also includes at least one network interface device (NID) by which the LE DPS receives and transmits information over one or more communication networks, including via a LE connect (LEC) network having a plurality of LE field devices communicatively connected thereto. The LE DPS further includes at least one processor coupled to the memory and the at least one NID. The at least one processor executes the SEND utility, which configures the LE DPS to: receive, from a tracking system communicatively coupled to the LE DPS via the one more communication networks, an ESEN that includes information identifying a security event, a location at which the security event occurred, and additional distinguishing details corresponding to entities involved in and affected by the security event; selectively transmits information from the ESEN to at least one LEC field device of an LE personnel within one of (i) a geographic vicinity of the location of the security event and (ii) a calculated zone of recapture, the additional distinguishing details enabling LE personnel to receive a more complete set of relevant details at the LE field device that enables more accurate identification, tracking, and resolution by the LE personnel of the security event.

According to one embodiment, the security event involves theft of at least one of a cargo and a transport vehicle associated with a shipment of the cargo, the cargo and transport vehicle being tracked by one or more location sensors, and the distinguishing details of the ESEN includes shipment-related information. The SEND utility further enables the LE DPS to: retrieve the distinguishing details from the received ESEN; identify a geographic location of the security event; select one or more LE personnel whose current location is proximate to or within a current zone of recapture to the geographic location; and embed, within the information transmitted to the LED field device of the one or more LE personnel, (i) the security event identifying information (SEII), including a description of the security event, the location at which the security event occurred, and a time of occurrence of the security event, (ii) a calculated zone of recapture, and (iii) additional distinguishing details providing descriptive data about one or more of the shipment, the cargo, the transport vehicle, the driver, the geographic location, and other data that facilitates more effective search and recovery operations by the LE personnel of the cargo and the transport vehicle.

According to a second aspect, a law enforcement (LE) field device includes: a memory having stored thereon a LE Theft Response (LETR) utility; and a network interface (NI) that enables exchange of communication between the LE field device and a LE connect (LEC) network having a LE data processing system (DPS) associated therewith. The LE field device also includes: a display device utilized to present a graphical user interface displaying notifications of security events and security event information, including distinguishing details; and at least one input device that enables entry of a selection or information by a LE personnel. The LE field device further includes a processor communicatively connected to the memory, the NI, the display device, and the at least one input device. The processor executes code of the LETR utility, which configures the LE field device to receive, via the NI, from the LE DPS, information from an enhanced security event notification (ESEN) about a security event, the information including: (i) security event identifying information (SEII), including a description of the security event, a location at which the security event occurred, and a time of occurrence of the security event, (ii) a calculated current zone of recapture, and (iii) additional distinguishing details. The information received from the ESEN enables more efficient assimilation of search information and a targeted response by selected LE personnel. The SEN utility also configures the LE field device to display portions of the information on the display device to notify the LE personnel of the security event. The SEN utility further configures the LE field device to selectively display other portions of the information, based on input received via the at least one input device, and to retrieve and present additional details from the distinguishing details selected from within the information.

According to one embodiment, the cargo and transport vehicle are equipped with one or more location sensors, with the sensors generating co-located signals that are tracked on a shipment tracking device of the tracking system. The security event includes detecting a simultaneous loss of reception for the co-located signals, the simultaneous loss indicative of a localized signal jamming technique that is associated with attempts to steal at least one of the cargo and the transport vehicle. The LE SEN utility further configures the LE field device to: receive, within the ESEN, a signal identifier (ID) associated with each of the co-located signals; transmit the signal ID to the LE field device to enable localized tracking of the signals at the LE field device when the signals come back online; and provide and map, on the display device, real-time updates of a detected location of the signal ID.

According to a third aspect, a method provides relevant tracking information for a shipment-related theft event. The method includes identifying, by a processor of a shipment tracking device, an occurrence of a security event involving a shipment of a cargo being transported by a transport vehicle, the cargo and transport vehicle being tracked by co-located signals from respective location sensors. The method includes prompting for extrinsic confirmation that the security event has occurred. The method further includes in response to receiving extrinsic confirmation that the security event has occurred: retrieving distinguishing details related to the shipment; and generating a confirmation signal and linking the distinguishing detail to the confirmation signal. The method also includes transmitting the confirmation signal along with the distinguishing detail to a shipment tracking DPS, the distinguishing detail being utilized by the shipment tracking DPS to generate an enhanced security event notification (ESEN) that is transmitted to a law enforcement (LE) DPS for dispatch to LE field devices.

According to one embodiment, the method includes enabling user input and capture of specific distinguishing details comprising one or more of a vehicle identification (VIN) number, vehicle tag numbers, a location where the vehicle was stolen, a tracking ID for the vehicle, an owner and/or driver details, including a driver's license number, address, and the driver's mobile device number, and one or more pictures of the cargo, the transport vehicle, the driver, and a driver's license of the driver. The distinguishing details includes one or more pictures and information associated with the cargo, the transport vehicle, and a driver, and the theft event. The method further includes storing the distinguishing details within a non-volatile storage of the shipment tracker device.

According to a fourth aspect, a data processing system (DPS) includes a memory having stored thereon a shipment location tracking and security utility (SLTSU) having a LE notification module/utility. The DPS includes at least one network interface device (NID) by which the DPS receives and transmits information via one or more communication networks, including a LEC network having at least one LE DPS that provides notification to and dispatching of select law enforcement personnel in response to receipt of information from the DPS identifying an occurrence of one or more LE trigger events. The DPS includes at least one processor coupled to the memory, the display device, and the at least one NID. The processor executes the SLTSU and the ESEN module to configure the DPS to receive, via the one or more communication networks, at least one signal from a sensor associated with an object being tracked. The at least one signal enables determination of a location and a security status of the object. The processor detects one or more anomalies associated with the at least one signal, where the one or more anomalies correlate with the occurrence of a LE trigger event involving the shipment. The DPS generates an enhanced security event notification ESEN having information relevant to the LE trigger event and forwards the ESEN to the LE DPS to trigger the LE DPS to transmit information from the corresponding ESEN to at least one LEC field device of LE personnel within a geographic vicinity of the location of the object.

In one embodiment, the ESEN module configures the data processing system to: retrieve from a shipment tracking database, a series of distinguishing data related to one or more of a driver, a shipment, a carrier equipment, and law enforcement historical data. The distinguishing data includes a plurality of relevant data from a group comprising: a description of the carrier equipment, one or more pictures of the carrier equipment; identifying data associated with the carrier equipment, including at least one of a license plate number and a vehicle identification (VIN) number; a copy of a cargo manifest; historical data associated with one or more of a location of the trigger event, a type of cargo, a type of carrier equipment, an origination point of the cargo, a destination point of the cargo, a shipper, and a receiving entity.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 5A-5D and 6A-6D respectively illustrates example shipment tracking user interfaces that each present a focused view of co-located shipment-related entities of a particular shipment being monitored, including alerts and/or notifications identifying detected security events associated with the shipment, according to one or more embodiments;

FIG. 10B illustrates example content presented within user interfaces of a driver's MCD, including the shipment tracking information and enhance security notification features incorporated into the viewable options and preference selections, according to one or more embodiments;

FIGS. 14A-14D illustrates a series of captured images/pictures of the shipping vehicle and bill of laden received within an ESEN and which are displayed on a LE field device as selectable options for enlargement, according to a plurality of embodiments;

FIG. 14E illustrates a user interface of the LE field device presenting shipment details, according to one embodiment.

DESCRIPTION OF ILLUSTRATIVE EMBODIMENTS

Figure 1A:
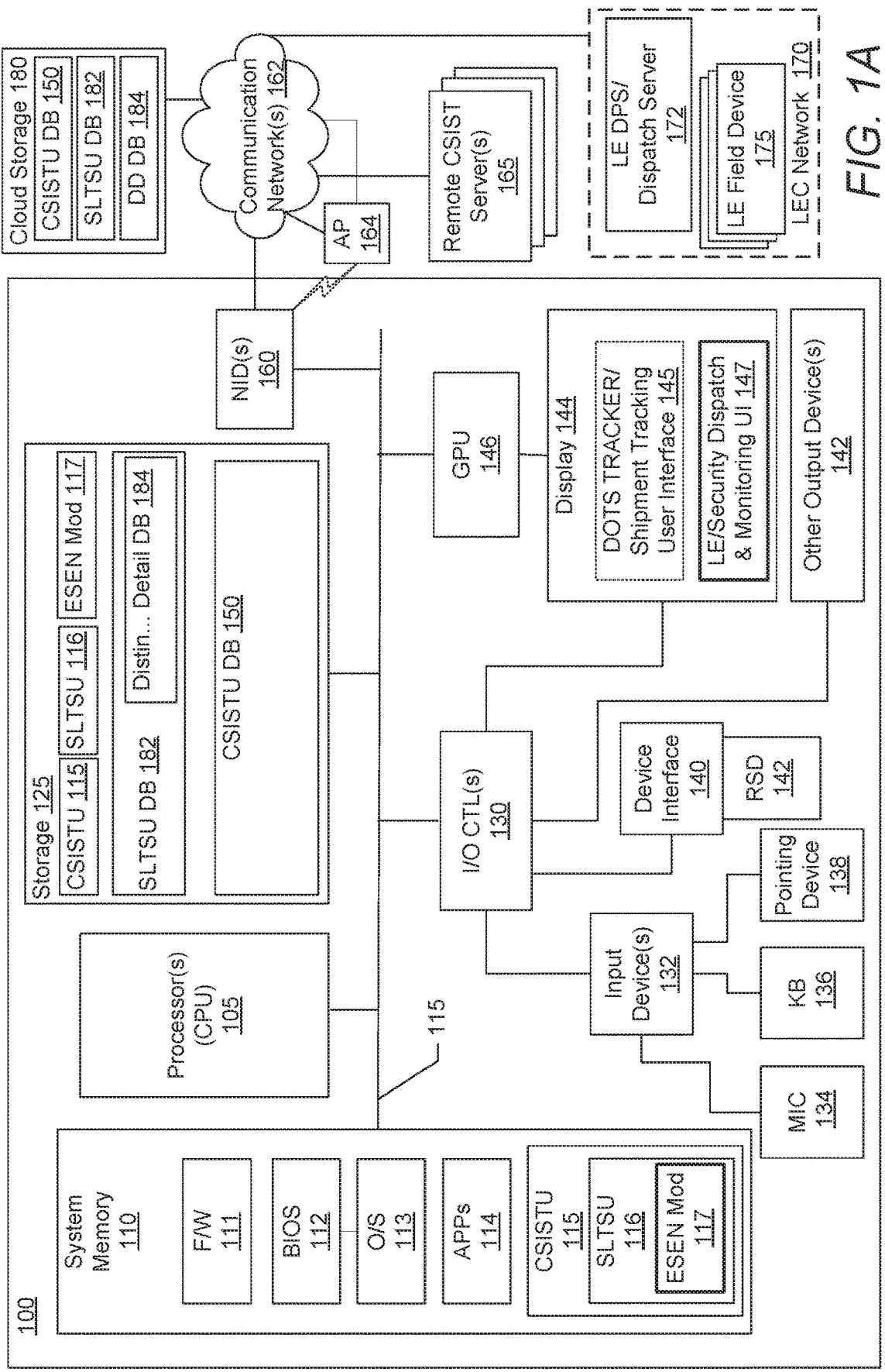
FIG. 1A illustrates an example data processing system (DPS) and connected networks and devices that enables implementation of various aspects of a shipment location tracking and security system, with connection to law enforcement, in accordance with one or more embodiments.

According to one or more aspects, the illustrative embodiments of the present disclosure include a plurality of data processing systems, mobile communication devices, and associated methods for providing enhanced security event notifications to law enforcement to enable more efficient tracking and identification of stolen cargo and/or transport vehicles. The disclosure presents a plurality of different devices that operate within a larger shipment location tracing and security monitoring environment where shipment-related entities, such as cargo and the transport vehicles carrying the cargo, are being tracked using localized tracking sensors. Specific implementation aspects of the disclosure provide a shipment location tracking data processing system (DPS), a law enforcement (LE) data processing system (generally utilized for both an investigative service team computer and a LE dispatch server), an LE field device, and a driver/operator mobile communication device. Each device is programmed to perform specific operations based on detection of an occurrence of a security event and/or the receipt of an enhanced security event notification (ESEN) having specific distinguishing details associated with the shipment-related entities and/or the security event.

The detailed description is subdivided using a series of alphabetized sections, each provided a section title. The division into sections are provided solely to enable clearer presentation of the different aspects of the disclosure. These sections are labeled and titled as follows:

Section A: Shipment Tracking and Security, With Integrated Law Enforcement Response Using Enhanced Security Event Notification Section B: Law Enforcement DPS—Security Event Investigative Services Section C: Driver Mobile Communication Device For Capturing Distinguishing Details and Providing Security Event Confirmation & Recovery Support Section D: Enhanced Law Enforcement Field Device, With ESEN Access Features It is appreciated that the descriptions of each of the different sections overlap in content. Presentation of features in a particular section is not intended to in any way limit the applicability of these features to only that section of the disclosure. All described features are fully applicable across the various sections, without limitation.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Within the description of the features of the disclosure and the accompanying drawings, the embodiments are presented from the perspective of a tractor-trailer based shipment environment, where a "shipment" includes a cargo being transported by a transport vehicle, such as a tractor trailer. Where or if utilized, the term "carriers" is provided to refer to (i) an owner-operator with a single equipment, (ii) an owner-operator or small business owner with several trucks, and who can employ multiple drivers, and (iii) a large commercial organization/company that includes a large number of trucks, e.g., hundreds of trucks and drivers. Additionally, the term "equipment" generally refers to the combination of "tractor and trailer", and covers the various different types of equipment available, including, but not limited to, flatbeds, dry vans, refrigerated trucks, etc. According to one embodiment, the relevant details of the equipment that is tracked includes the type of equipment as well as the available capacity of the specific equipment to load additional cargo. It is appreciated that, while specific types of cargo hauling trucks fall under the term equipment, the term equipment can also apply to different types of trucks or motorized vehicles, without limitation. Additionally, the underlying features of the disclosure are fully applicable to other transportation and/or shipping spaces, such as water-based shipping (e.g., ocean cargo or river cargo), where carriers are boat owners carriers or cargo ship captains, the equipment are the water vessels or amphibious vessels, and the shipper can be any registered person or business that has a cargo that can be transported over water from a cargo pick-up point to a delivery destination by a carrier. Air based transportation is also a supported space that can include a framework designed for interfacing by air-based cargo shippers and pilots with planes, etc. It is further foreseeable that the functionality of the presented framework/environment can be extended to a transportation space involving drone shipments, for example, where the drone operators (pilots) are not co-located with the drone equipment.

For simplicity and to present the LE related embodiments, the disclosure is described from the perspective of a shipment that includes a cargo being transported by a transport vehicle, such as a tractor-trailer combination, where the carrier is a trucker and the equipment is a truck or tractor (an on-land motor vehicles) to which a trailer or container is hitched. It is understood that the features and functionality described herein can also be applicable to different types of on-land motorized equipment, such as cars, RVs, busses, motorcycles, and the like, without limitation. Extension to bicycles and other non-motorized form of transportation can also be applicable.

Certain coined terms are utilized herein in describing the features and functionality of the disclosure. For example, the term "shipment-related entity" is utilized to reference each of the following, without limitation: a cargo, a cargo container, a tractor (e.g., a motorized vehicle), a trailer or container, a transport vehicle or a tractor-trailer as a single or combined operator equipment, a driver/operator, an operator mobile communication device. Each shipment-related entity has a separate location tracking mechanism that enables the geographic location of the entity to be determined. In one or more embodiments, the location tracking mechanism is a transponder. The location tracking mechanism provides a unique location signal for the particular shipment-related entity. The term "shipment group" generally represents any two or more of the shipment-related entities that are assigned to a same shipment. Entities in a shipment group are expected to be physically co-located while the shipment is being delivered. Certain limited exceptions or deviations to the co-location of one or more of the entities is anticipated and accounted for by the algorithm provided herein. The grouping of entities is expected to be within a specific range/radius of each other and to move in the same direction as each other, with some limited exceptions (e.g., when a truck driver/operator leaves the truck/tractor-trailer at a truck stop or at a shipment pickup or drop-off location). Further, in one embodiment, the term "shipment-related entities" can refer to and be inclusive of the owner of the cargo, the owner of the transport vehicle, if different from the driver, the intended recipient of the cargo, and others with a vested interest in the cargo and/or the transport vehicle.

The term "distinguishing details" is generally utilized to refer to specific details about an item, such as one of the shipment-related entities, that provides a high-value recognition of the item by a LE personnel. For example, a distinguishing detail would include an actual picture of the item or a specific description of features of the item that would otherwise not be available to LE personnel. Other distinguishing details are presented herein within the description of the embodiments. Also, the term "investigative services" or "investigative services team" refers to a group that is assigned to investigate a particular type of crime. For example, a cargo theft investigative services team would be a group within law enforcement that specializes in investigating cargo theft. Additionally, it is appreciated that the investigative services team may be at a different jurisdictional level from the LE personnel that are eventually task with resolving the security event (e.g., a cargo theft). Thus, for example, cargo theft involving interstate transportation may generally fall under the federal jurisdiction of an FBI (Federal Bureau of Investigations) cargo theft task force. That task force maintains primary jurisdiction for resolving all cargo theft in the entire US and maintains a database of important historical and empirically determined information and data related to cargo thefts across the entire continental US. However, investigation and resolution of a specific theft may be assigned to a local, state or city level LE personnel who works in the geographic location of the theft or the likely perpetrators. According to one aspect, the reporting of the security event is first provided to a selected investigative services team, and the investigative services team then identifies a best local LE dispatch service and transmits the notification (enhanced with distinguishing details and historical data) to a particular geographically-located LE dispatch service to forward to LE personnel in the geographic location of the security event.

Throughout the description, the term shipment refers primarily to the transportation of cargo via a transport vehicle from an origination point to a delivery destination. Other terms utilized throughout the disclosure are provided with functional descriptive names that represent the meanings and/or the context in which the terms are presented and/or utilized.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The attached figures present various aspects and/or features of the described embodiments; however, certain features may not be expressly presented within the figures and/or the description thereof. Within the descriptions of the different views of the figures, similar elements are provided similar names and reference numerals as those of the previous figure(s). The description of the illustrative embodiments are therefore be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Figure 9:
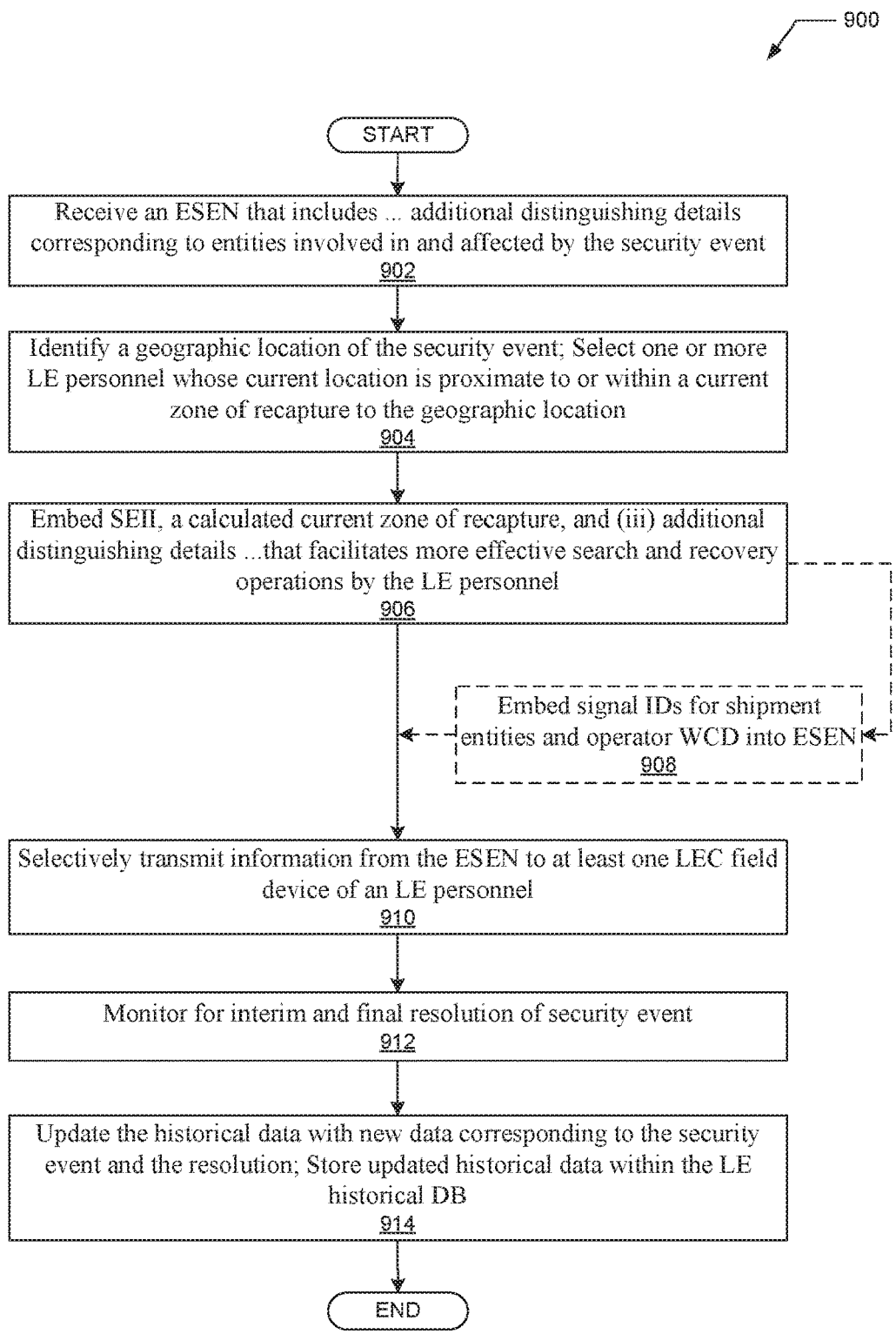
FIG. 9 provides a flow chart illustrating a method by which a LE DPS responds to receiving an ESEN by dispatching appropriate information and distinguishing details to selected dispatch servers and associated LE personnel, in accordance with one or more embodiments.

Those of ordinary skill in the art will appreciate that the hardware, firmware/software utility, and software components and basic configuration thereof depicted in the following figures may vary. For example, the illustrative components of CSIST data processing system (DPS) 100 (FIG. 1A), LE DPS 171 (FIG. 9A), mobile communication device (MCD) 250 (FIG. 10A), and LE field device 175 (FIG. 12A) are not intended to be exhaustive, but rather are representative to highlight some of the components that are utilized to implement certain of the described embodiments. For example, different configurations of either computer device 100 or user mobile communication device 250 may be provided, containing other devices/components, which may be used in addition to or in place of the hardware depicted and/or described, and may be differently configured. The depicted examples are therefore not meant to imply architectural or other limitations with respect to the presently described embodiments and/or the general innovation.

Section A: Shipment Tracking and Security, with Integrated Law Enforcement Response Using Enhanced Security Event Notification According to a first aspect, a data processing system, a shipment location tracking and security monitoring system, and a method are provided for electronically tracking a shipment and providing enhanced security and safety of the shipment by automatically notifying law enforcement (LE) to respond to theft and other security events affecting the shipment, such as signal jamming attacks. A system electronically tracks each or multiple shipment-related entities as a group of co-located dots that are monitored to provide enhanced security of the shipment from attacks or unauthorized or illicit actions that can compromise the shipment's safety. A data processing system (DPS) receives a plurality of location tracking signals of multiple shipment-related entities, associates the location tracking signals as a shipment group that is assigned a unique shipment tracking identifier (STID), and presents the shipment group as a plurality of co-located dots on a shipment tracking user interface (STUI). The DPS monitors for any unscheduled deviations in at least one of an expected co-location/geo-location of the location tracking signals, identifies specific types of unscheduled deviations, and triggers a series of responsive actions to protect the shipment, including automatically generating an enhanced security event notification (ESEN) that is transmitted to law enforcement for localized LE recovery support. The unscheduled deviations can include signal jamming attacks, incorrect pickup (or theft) of an operator-assigned shipment, and unexpected separation of the tracked entities.

Generally, the illustrative embodiments further provide for different forms and methods of dot-based, automated tracking of shipments, with computer-based detection of abnormalities in the movement of the co-located dots and subsequent response to the detected abnormalities by automatic computer-based generation of one or more notifications and/or triggering of responsive actions. One implementation of the disclosure generally provides security tracking of a shipment by presenting and monitoring the movement of multiple co-located dots, with each dot representing one of multiple shipment-related entities. The movement of the co-located dots are then analyzed to enable detection of potential bad events that negatively affect the shipping vehicle/vessel and/or the shipment or cargo, such as abandonment of a shipment by the operator/driver, as one application. Other applications of the disclosure provide embodiments for generation of real-time alerts and/or LE notification of potential theft of cargo and/or a transportation vehicle, such as a tractor-trailer, where the theft is being facilitated by signal jamming attacks or location sensor tampering.

The disclosure expands on the use of systems for tracking a location of one or more shipment-related entities involved in the shipment of a cargo. For example, to track the location of a cargo and/or a tractor-trailer, a location tracking device (such as a transponder) can be attached to the entity being tracked, in one embodiment. The location tracking device wirelessly communicates a location signal indicating a geographic location of the tracked entity. The location of a single entity associated with the shipment can then be tracked via a single dot on a tracking/monitoring computer that receives the geographic signals from the location tracking device.

In conventional shipments that include a single transponder to track the location of a shipment and/or the tractor-trailer, thieves and others who intend to take or otherwise interfere with the cargo/shipment or the tractor-trailer have resorted to utilizing jamming techniques to block the outbound signals of the transponders. Once the signals are blocked, the thief can then proceed to remove the cargo from the tractor-trailer or steal the tractor and/or trailer or the combination thereof with the cargo, knowing that the location of the shipment can no longer be traced. By using this jamming attack on the transponder signal, no wireless trace is transmitted for the monitoring computer to later detect the location of the stolen items, when the theft is later discovered. By the time the theft is discovered, the thief is likely long gone with the shipment. The present disclosure addresses this use of signal jamming by providing a monitoring system that quickly identifies when the signal jamming attack has been initiated and a responsive system to notify the relevant parties and law enforcement personnel to respond to and prevent the theft of or recover the cargo, container, or transport vehicle.

Additionally, a cargo or a trailer containing cargo is occasionally assigned by a shipper for pick up by a selected/authorized driver/operator from a pick-up point, such as a cargo on-loading dock. There are occasions when the cargo or trailer is deliberately or inadvertently hitched to the vehicle (e.g., a truck) of another operator and taken away from the pick-up point by the incorrect/unauthorized operator. When the correct/authorized operator arrives, there is no cargo/trailer to pick up, and the un-authorized operator may be long gone with the shipment. The shipper and other associated/interested parties are forced to deal with a loss of the shipment, with a resulting loss in time and/or financial loss, particularly if the cargo or trailer was deliberately taken by the unauthorized operator and is not recovered. Again, aspects of the disclosure address each of the above scenarios and provides a solution that enables early detection of these activities and triggered notifications and responses that mitigate the effects of the specific activity detected.

Referring now to the figures, and beginning with FIG. 1A, there is illustrated an example server data processing system (DPS) 100 within which can be implemented various aspects of the disclosure and in particular cargo/shipment tracking, with detection and notification of potential abnormalities that can be indicative of bad act, in accordance with one or more embodiments. In one embodiment, DPS 100 can be one sever within a cluster of servers, where the servers can be co-located in a single location and/or geographically dispersed over a plurality of locations. In other embodiments, DPS 100 can be any electronic device such as, but not limited to, a desktop computer, notebook computer, or a single server. Additionally, in one embodiment, DPS 100 can be implemented as a virtual machine sharing hardware resources of a physical server. In one embodiment, DPS 100 operates as a networked computing device providing a cloud infrastructure that supports implementation of a carrier and shipper interfacing and shipment tracking (CSIST) framework. Generally, DPS 100 can operate as both a data aggregator and/or a monitoring center computer. As a data aggregator, DPS 100 receives additional amounts of information from shipment-related entities to enable other features and functionalities, included those described within the parent application. As a monitoring center computer, DPS 100 can be configured with additional methods and components for generating notifications and responding to detected conditions.

According to one aspect, storage of DPS includes SLTSU DB which has stored thereon shipping data utilized and periodically updated by the SLTSU. The SLTSU enables DPS 100 to concurrently track multiple different shipment groups in multiple different geographic locations, update a shipping history of each of the multiple different shipment groups during a life cycle of each shipment, and store the update within the storage/SLTSU DB. Additionally, DPS 100 aggregates, associates, and/or correlates detected activities, location, and triggered responses in a learning module that facilitates future handling of similar detected events that can occur.

Example DPS 100 includes at least one processor, and potentially a plurality of processors, generally referenced hereinafter as central processing unit (CPU) 105. CPU 105 is coupled to system memory 110, non-volatile storage 125, and input/output (I/O) controllers 130 via system interconnect 115. System interconnect 115 can be interchangeably referred to as a system bus, in one or more embodiments. One or more software and/or firmware modules can be loaded into system memory 110 (from storage 125 or other source) during operation of DPS 100. Specifically, in the illustrative embodiment, system memory 110 is shown having therein a plurality of software/firmware modules, including firmware (F/W) 111, basic input/output system (BIOS) 112, operating system (OS) 113, and application(s) 114. Additionally, system memory 110 includes CSIST utility 115 and shipment location tracking and security utility (SLTSU) 116. SLTSU 116 includes ESEN Module 117 (or LE Connect module). While shown as a separate module, SLTSU 120 can, in alternate embodiments, be provided as one of applications 114 and/or as an executable component within F/W 111 or OS 113. Additionally, while presented as a module within SLTSU 116, ESEN Mod 117 can be a separate, stand-alone module, in alternate embodiments and can be executed independent of (i.e., without requiring the concurrent execution of) SLTSU 116. The software and/or firmware modules within system memory 110 enable DPS 100 to provide varying features and functionality when their corresponding program code is executed by CPU 105 or by secondary processing devices (not specifically shown) within DPS 100.

I/O controllers 130 support connection by and processing of signals from one or more connected input device(s) 132, of which microphone 134, keyboard 136, and pointing/touch device 138 are illustrated, by way of example. Pointing/touch device 138 can be a mouse or a touch pad, or stylus, for example. It is appreciated that input devices can also include, as a non-exclusive list, hardware button(s), touch screen 146, infrared (IR) sensor, a fingerprint scanner, and the like. I/O controllers 130 also support connection with and forwarding of output signals to one or more connected output devices, including display 144 and other output devices 148. Display 144 can include a touch screen 146 that serves as a tactile input device. In one embodiment, DPS 100 also includes a graphics processing unit (GPU) 146, which is communicatively (or physically) coupled to display 144 and to processor 105. GPU 146 controls the generation and presentation of certain user interfaces (UIs) that are created during execution of SLTSU 116 by CPU 105. As a specific embodiment, and as described in greater detail below, SLTSU 116 generates shipment tracking user interface (STUI) 145, which is presented on display 144 and on which a grouping of co-located signal dots are presented and monitored for detection of security breaches with the associated shipment. In one or more embodiments, STUI 145 can also be interchangeably referred to herein as a DOTS tracker UI, which describes the base functions provided by STUI 145 of co-locating and tracking the dots assigned to the shipment-related entities in a shipment group.

With continuing reference to FIG. 1A, in one or more embodiments, one or more device interfaces 140, such as an optical reader, a universal serial bus (USB), a card reader, Personal Computer Memory Card International Association (PCMIA) slot, and/or a high-definition multimedia interface (HDMI), can be associated with DPS 100. Device interface(s) 140 can be utilized to enable data to be read from or stored to corresponding removable storage device(s) (RSD) 142, such as a compact disk (CD), digital video disk (DVD), flash drive, or flash memory card. In one or more embodiments, device interfaces 140 can further include General Purpose I/O interfaces, such as Inter-Integrated Circuit (I²C), System Management Bus (SMBus), and peripheral component interconnect (PCI) buses. In accordance with one embodiment, the functional modules (e.g., SLTSU 116) described herein and the various aspects of the disclosure can be provided as a computer program product. The computer program product includes removable storage device(s) 142 as a computer readable storage medium, on which is stored program code when executed by a processor causes the processor to implement the various functions described herein, including, but not limited to, the features presented in the flow charts of FIGS. 7, 8A and 8B.

DPS 100 further includes network interface device (NID) 160, which can include both wired and wireless networking devices (not specifically shown). NID 160 enables DPS 100 and/or components within DPS 100 to communicate and/or interface with other devices, services, and components that are located external to DPS 100. In one embodiment, DPS 100 may directly connect to one or more of these external devices, via NID 160, such as via a direct wire or wireless connection. In one or more embodiments, DPS 100 connects to specific external devices, services, and/or components, such as information server(s) 165 and cloud database (DB) 180, via external communication network(s) 162, using one or more communication protocols. In the illustrative embodiment, cloud storage 180 includes respective data storage for the different functional utilities or modules. Thus cloud storage 180 includes CSISTU DB 151 and SLTSU DB 182, which includes distinguishing details (DD) DB 184. Network 162 can be a local area network, wide area network, personal area network, and the like, and the connection to and/or between communication network 162 and DPS 100 can be wired or wireless (via access point 164) or a combination thereof. For purposes of discussion, communication network 162 is indicated as a single collective component for simplicity. However, it is appreciated that network 162 can comprise one or more direct connections to other devices as well as a more complex set of interconnections as can exist within a wide area network, such as the Internet. In one embodiment, CSISTU 115 provides an interactive framework that is accessible via the Internet (162) as a website having one or more domain names affiliated therewith.

As one aspect of the disclosure, SLTSU 116 and ESEN Mod 117 include a plurality of functional modules that execute on CPU 105 to perform specific functions, and these functional modules utilize and/or generate specific data, which data is stored as information and/or data within storage 125 and/or within cloud database 180. As an example, storage 125 is shown to include a copy of SLTSU 122 and SLTSU DB 182. Also, both locally-stored and remotely-stored SLTSU DBs 182 store relevant data utilized by SLTSU 122 to perform the dots mapping and the monitoring for and identifying security breaches and other notification features described herein. In one or more embodiments, SLTSU DB 182 contains historical data about previous shipments, including environmental and other events, such as detected anomalies/deviations in co-location and movement of the dots that correspond to certain types of security breaches. SLTSU DB 182 also contains information about the notifications and other responsive actions that resulted in successful resolution of detected anomalies/deviations and/or confirmed security breaches.

Figure 1B:
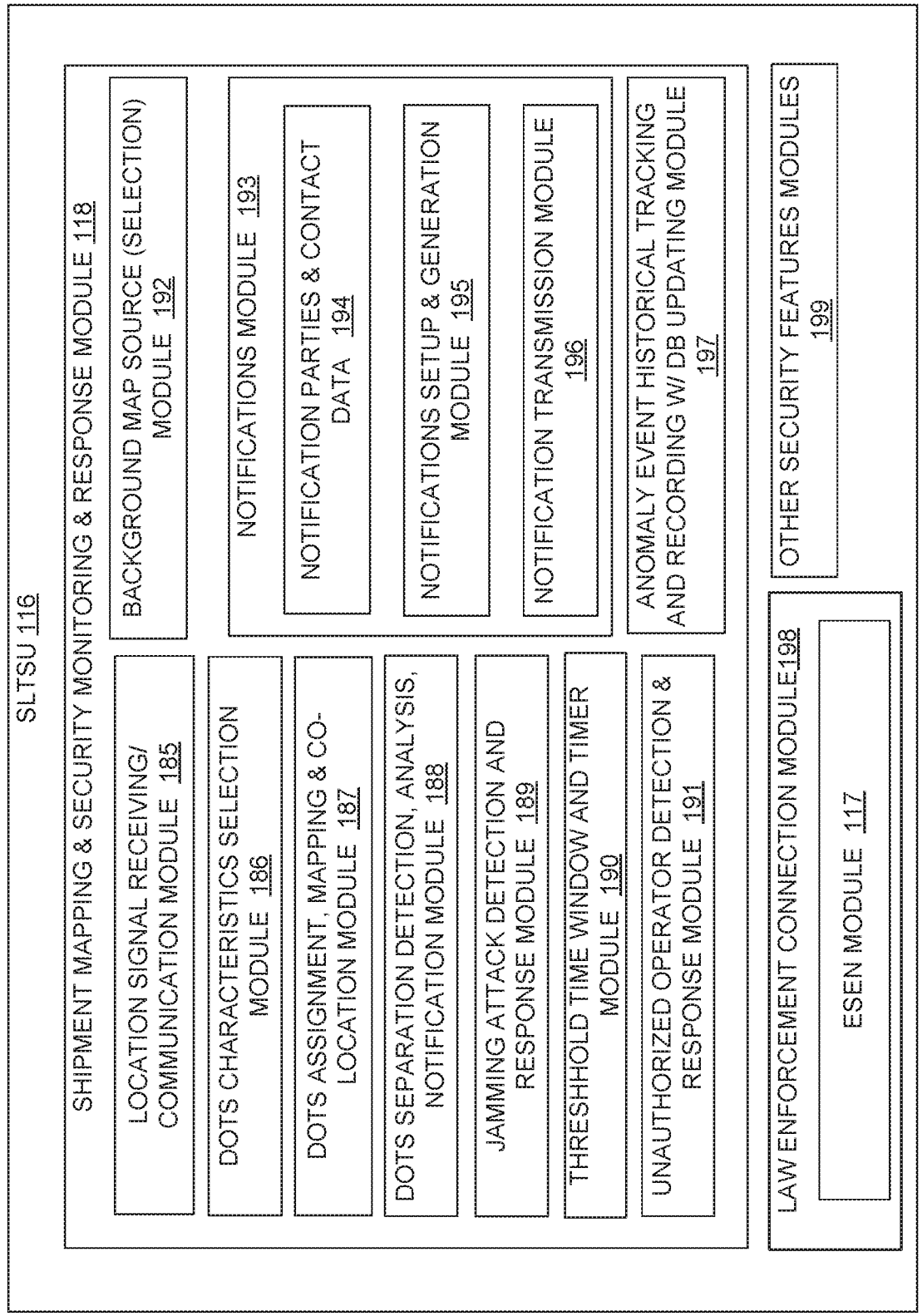
FIG. 1B provides a block diagram representation of example functional modules that support the various different features provided by a shipment location tracking and security utility (SLTSU) and an enhanced security event notification utility (ESENU) executing within the DPS of FIG. 1A, in accordance with one or more embodiments.

FIG. 1B provides a block diagram representation of some of the functional (software) modules that performs the various features and operations of SLTSU 116 when executed by processor 105. Included within SLTSU 116 is a shipment mapping and security monitoring and response module 118, which in turn includes, without limitation, locations signal receiving/communication module 185, dots characteristics selection module 186, dots assignment, mapping and co-location module 187, dots separation detection, analysis, notification module 188, jamming attack detection and response module 189, threshold time window and timer module 190, on authorized operator detection and response module 191, background map source (select) module 192, notifications module 193, and anomaly event historical tracking and recording module 197, which provides database updating features. Within notifications module 193 are notification parties and contact data 194, notifications set up and generation module 195, and notification transmission module 196. It is appreciated that the functions performed by one or more of the module may overlap and that the presentation of specific modules with specific, functionally-descriptive names applied to the modules is not intended to in any way limit or define the actual makeup of SLTSU 122, in other embodiments. In addition to the modules within shipment mapping and security monitoring module 184, SLTSU 122 also includes law enforcement connection module 198 within which is provided ESEN module 117. SLTSU 116 also includes other security features modules 199, which serves as a general catch-all for the other modules possible within STLSU 116.

As shown in FIG. 1A, DPS 100 is also communicatively connected to LE DPS (Investigative Services Team Server) 171. LE DPS 171 exists within LE connect (LEC) network 170, which includes and a plurality of localized LE dispatch servers 172, each supporting communication of security events with a plurality of LE field devices 175.

Figure 2A:
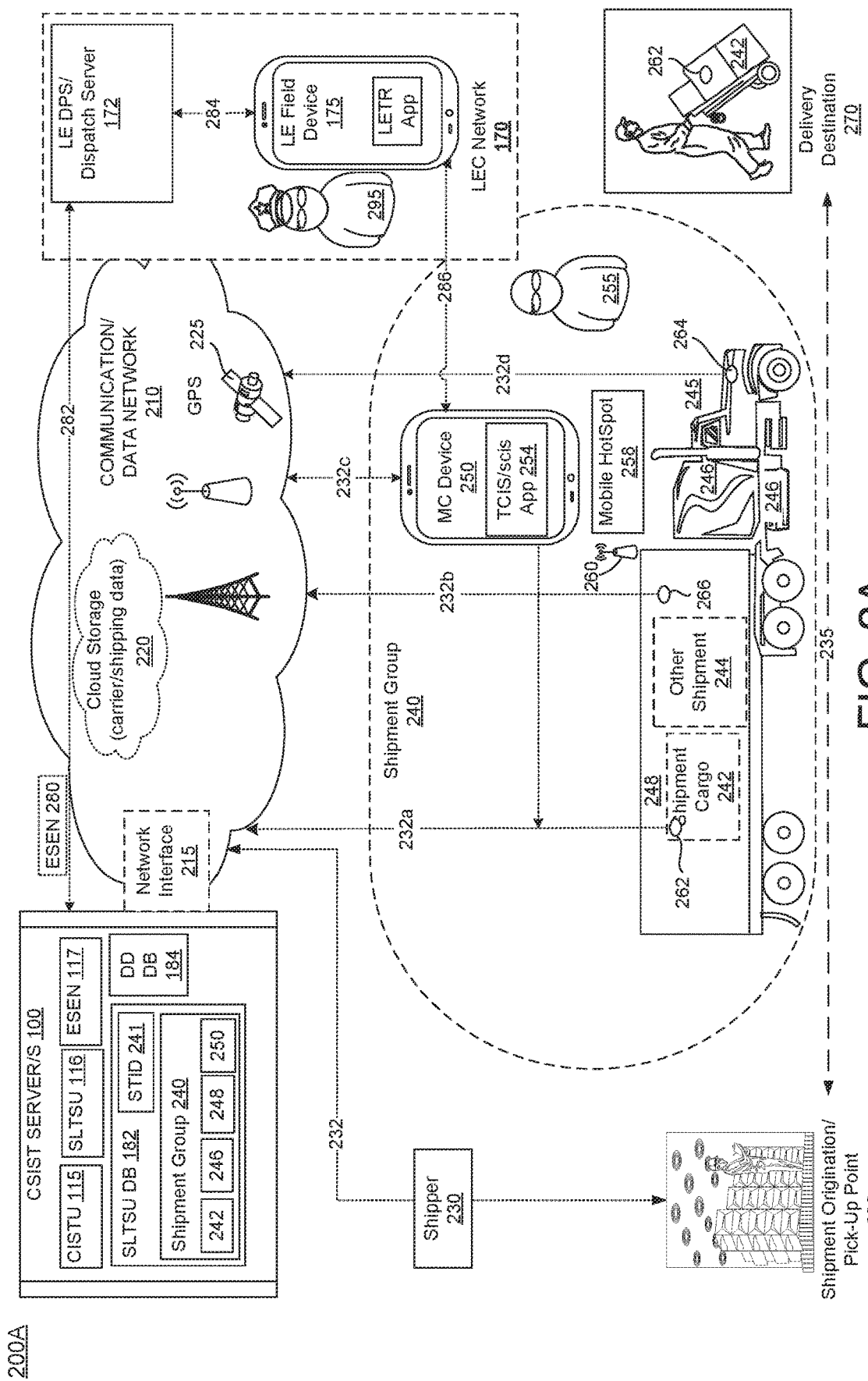
FIG. 2A illustrates an example shipment tracking environment complete with shipment location and tracking mechanisms and connection to a law enforcement (LE) dispatch system for use in enabling real-time LE notification of theft associated with a shipment, according to one or more embodiments.

FIG. 2A illustrates an example communication infrastructure (or communication network environment) 200 that extends the functionality of a CSIST framework to enable the various features and functionality provided by the disclosure. These features and functionality include, but are not limited to, enabling dots-based location tracking of shipment-related entities, monitoring for anomalies indicative of a potential security breach, identifying security events based on evaluation of and/or changes in the location signals received via communication infrastructure 200 from the different shipment-related entities, issuing notifications of the security event to law enforcement. Additional features and functionality include capturing and storing distinguishing details of the shipment-related entities, generating an enhanced security event notification (ESEN), including the distinguishing details for the shipment-related entities, and transmitting the ESEN with the distinguishing details to law enforcement (LE DPS and LE field device) in response to the security event.

Communication infrastructure 200 generally includes data processing system (remote CSIST server) 100 within which is provided CISTU 115 and SLTSU 116 and an associated SLTSU DB 182. SLTSU DB 182 is shown to include an example shipment group 140, which includes four shipment-related entities 242, 246, 248, 250. Shipment group 140 has been assigned a unique shipment tracking identifier (STID) 241 by SLTSU 122. CSIST Server 100 further includes ESEN Module 117 and its associated DD DB 184.

Communication infrastructure 200 also includes communication/data network 210 (which can be synonymous with network 162). Communication/data network 210 includes a plurality of communication devices and subnetworks that enable voice, data, and other forms of communication. Communication/data network 210 supports transmission of wirelessly communicated signals via intermediary receiving devices, such as antennas and access points. Communication/data network 210 also includes cloud storage 220 for storing relevant carrier and shipping data and other historical data utilized by SLTSU 122. Network interface 215 enables communication of location signals and other data and/or information between data processing system 100 and communication/data network 210. Communication infrastructure 200 further includes global position satellite (GPS) 225 as an example of one technology for determining a current geographical location of a shipment-related entity, as described herein. Communication infrastructure 200 includes a communication link 232 with shipper 230, who manages shipment of cargo 242 from shipment origination point 232. The cargo (or shipment) 242 is transported as a part of a shipment group 240 to shipment delivery destination 270 via a shipping route 235.

Communication infrastructure 200 further includes a plurality of communication links 232a-232d each providing location signals transmitted from (or for) a corresponding shipment-related entity within shipment group 240. As illustrated within communication infrastructure 200, shipment group 240 is generally comprised of shipment/cargo 242, tractor-trailer equipment 245 collectively, operator 255, and operator communication device 250(s), each having a location tracking mechanism for providing a unique location signal that is communicated to data processing system 100 via network 210. In one alternate embodiment, each of tractor (vehicle) 246 and trailer (container) 248 are equipped with separate location tracking mechanism, such that each can be tracked separately.

As shown, location tracking mechanism 262 of shipment 242 transmits first location signal 232a to network 210, location tracking mechanism 266 of trailer/container 248 transmits second location signal 232b to network 210, location tracking mechanism 266 of operator's mobile communication device 240 transmits third location signal 232c to network 210, and location tracking mechanism 264 of tractor/truck 246 transmits fourth location signal 232b to network 210. In one embodiment, the location tracking mechanism placed on/in one or more of the shipment-related entities is a transponder that transmits a unique transponder signal. In other embodiments, the location tracking mechanism can be a more sophisticated device, as is generally known to those skilled in the art. For example, the operator's mobile communication device can rely on cell tower triangulation for location detection or GPS-based location detection.

The transmission of ESEN 280 and other LE communication occurs via the indicated communication networks. As shown, ESEN 280 is communicated from CSIST server 100 to LE DPS 171 along communication path 282 through communication network 210. LE DPS 171 then communicates information from ESEN 280 and other relevant historical data/information to selected LE dispatch server 172 along communication path 283. LE dispatch server 172 forward the updated ESEN to LE field device 175 via communication path 284 through LEC Network 170. As further shown, in one embodiment, certain of the distinguishing details of ESEN 280 can be communicated directed from MCD 250 to LE field device 175 along a communication path 286 established between the two devices. LE personnel 297 may initiate the communication with MCD 250 of driver/operator 255 in response to receiving notification of the security event (e.g., from LE Dispatch Server 172) and the driver/operator's contact information, such as the phone number of MCD 250.

Figure 10A:
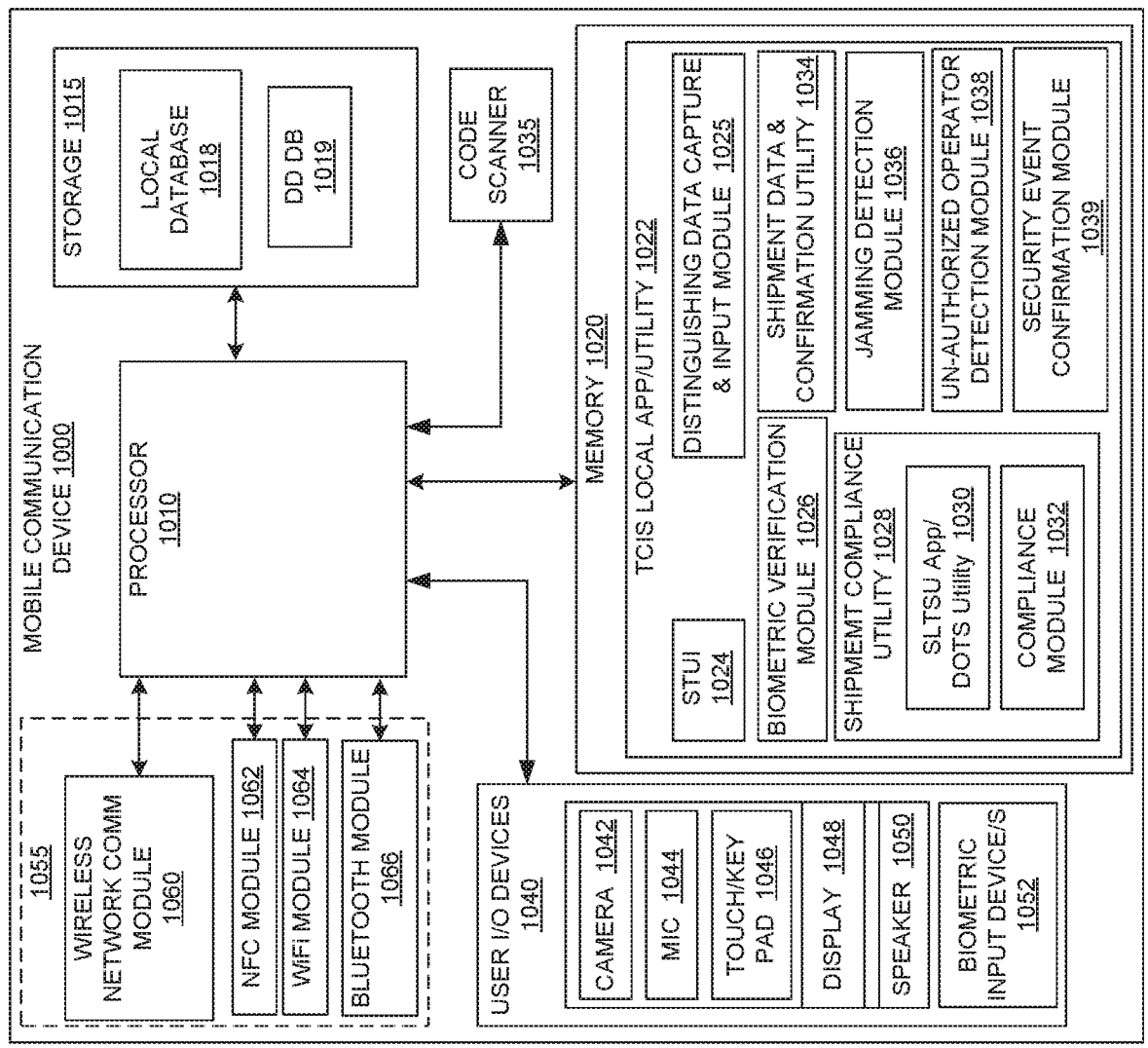
FIG. 10A illustrates an example mobile communication device utilized by an operator/driver and which is equipped with a shipment location signal tracking app to enable real-time tracking of the shipment group and a security confirmation module to provide extrinsic confirmation of an occurrence of a security event affecting the shipment group, in accordance with one or more embodiments.
Figure 10A:
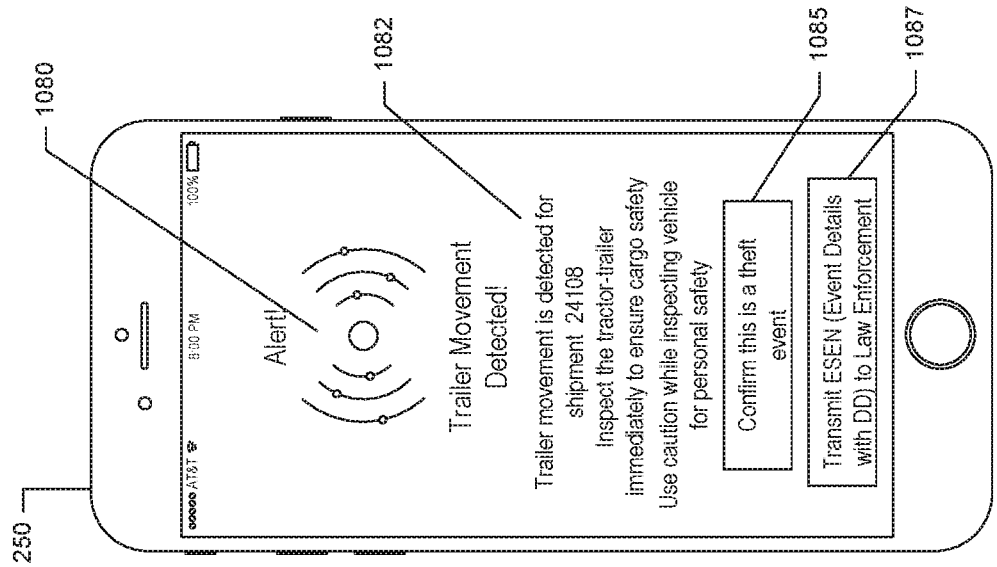

As illustrated, the operator's mobile communication device 250 is configured with one or more applications 254, including shipment location tracking, dots generation and tracking app, which enables the localized tracking of the shipment 242 and tractor-trailer 245 by operator, as described in greater detail within the description of FIG. 10. Similarly, LE field device 175 also executes an application or utility to support the intercommunication and exchange of relevant distinguishing details in response to receipt of the notification of a security event.

According to one or more embodiments, location transponder 262 of shipment 242 can be attached to either the exterior or interior of the case or packaging for that shipment 242 or on the cargo itself. According to one or more embodiments, data is accumulated from a plurality of transponders, and the collected transponder signals/data are transmitted back to CSIST server 100. In one embodiment, all of the transponder data is forwarded to a single collection point within tractor-trailer 245, and the collected data is compiled utilizing a proprietary compilation method and forwarded via a proprietary protocol for processing via CSIST utility 120 and/or SLTSU 122. In one embodiment, the transponder is a part of a sensor system that captures different information about or associated with the shipment, including but not limited to: real time positioning; cargo environment, such as temperature and humidity; event occurrence; motion, intrusion, and other activities affecting cargo. In one embodiment, operator equipment (i.e., tractor-trailer 245) includes a mobile hotspot 260 that enables communication from operator equipment (245) back to CSIST server 10B via communication network 210.

Communication infrastructure 200 enables efficient communication with carriers or operators and supports the monitoring and tracking of the various shipment-related entities within shipment group 240. In one embodiment, communication infrastructure 200 is also configured to receive real-time or projected information about the environment, such as weather conditions, along the route 235 that can affect the security of the equipment and/or the cargo, according to one embodiment.

While not shown, it is contemplated that, in one embodiment, operator 255 can also be provided with a separate transponder to enable a location of operator to be ascertained relative to the shipment, for instances in which operator 255 may leave his mobile communication device 250 inside the tractor or at another location, separate from operator's location. The level of security required for a particular shipment may necessitate the operator 255 agree to wear a tracking device while transporting the shipment.

Figure 2B:
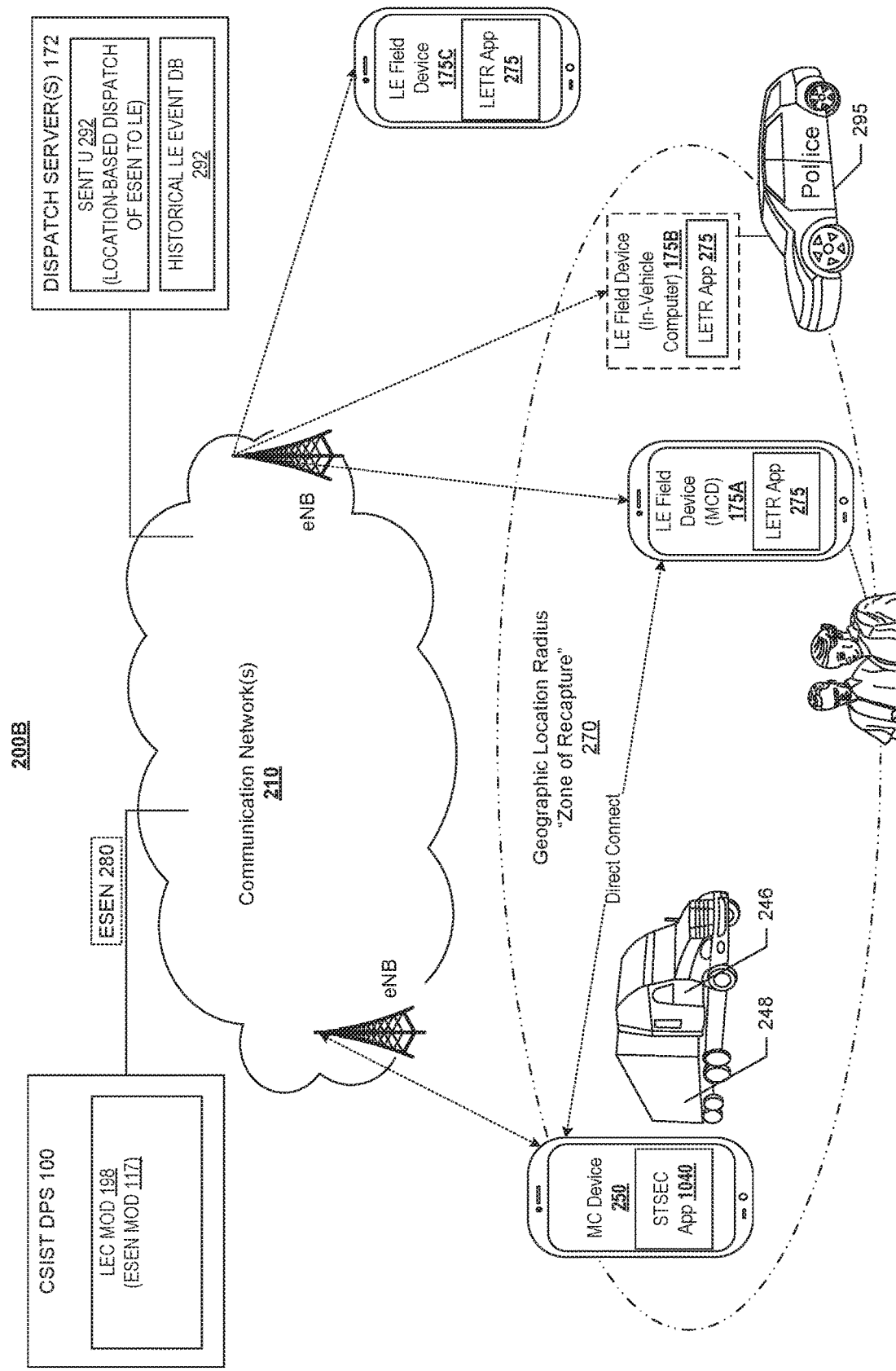
FIG. 2B illustrates an example LE security event notification communication network connecting a law enforcement dispatch server and LE field devices for use in facilitating theft response and recovery of stolen shipments, according to one or more embodiments.

FIG. 2B provides a different presentation of communication infrastructure 200B with interconnections between various mobile communication devices (MCD and LE field devices) from LE DPS, according to one embodiment. As shown, shipment (245) is located within a zone of recapture 270, which is a calculated radius within which the shipment is believed to be located based on the time at which the security even occurred, the type of transport vehicle, and other factors related to the shipment, the geographic location, and historical data. According to one embodiment, this zone of recapture is calculated by LE DPS 171 when ESEN is initially received. The zone of recapture 270 is also utilized to determine which LE Dispatch server (and by extension LE personnel) to assign to the recovery of the shipment, based on the current location of the different LE personnel dispersed throughout the larger geographic region covered by the Investigative Services Team operating through LE DPS 171. Thus, LE DPS 171 may select only LE Dispatch Server 172A to transmit the updated ESEN to, in one embodiment. Alternatively, in another embodiment, LE DPS 171 may select both LE Dispatch Servers 172A, 172B and transmit the updated ESEN to both for dispatch to different groups of LE personnel. Accordingly, in one or more embodiments, inter-jurisdictional support may be requested to resolve a single security event. Once LE dispatch server 172 receives the updated ESEN with authority to dispatch to local lE personnel, LE dispatch server 172 transmits the updated ESEN (with relevant historical data) and/or other distinguishing detail to the LE Field devices A and B, which are both located within the zone of recapture. In the illustrative embodiment, the updated ESEN is not presented to LE field device C or D, which are located outside of the zone of recapture or associated with a dispatch server not provided the ESEN from LE DPS 171. It is appreciated that the zone of recapture may increase exponentially as the time since the occurrence of the security event increases. LE field devices not initially included in the group to receive the ESEN may later be added to the group and provided the ESEN.

As further shown, two different types of the LE field devices are presented. First LE field device 175 is a mobile handheld device, the is carried by E personnel 295 while walking. Second LE field device 175B is an in-vehicle or vehicle-mounted device that is located within the police vehicle 295. Each LE Field device is illustrated having an LE theft response (LETR) app located thereon. Additional details of an example LE field device 175 are presented in FIG. 12A, described later herein. It is appreciated that the selection of which LE personnel to assign to a particular security event can different based on different considerations by the dispatching person or device and the present disclosure is applicable regardless of which type of LE field devices are provided the ESEN and/or distinguishing details related to the shipment.

Figure 3:
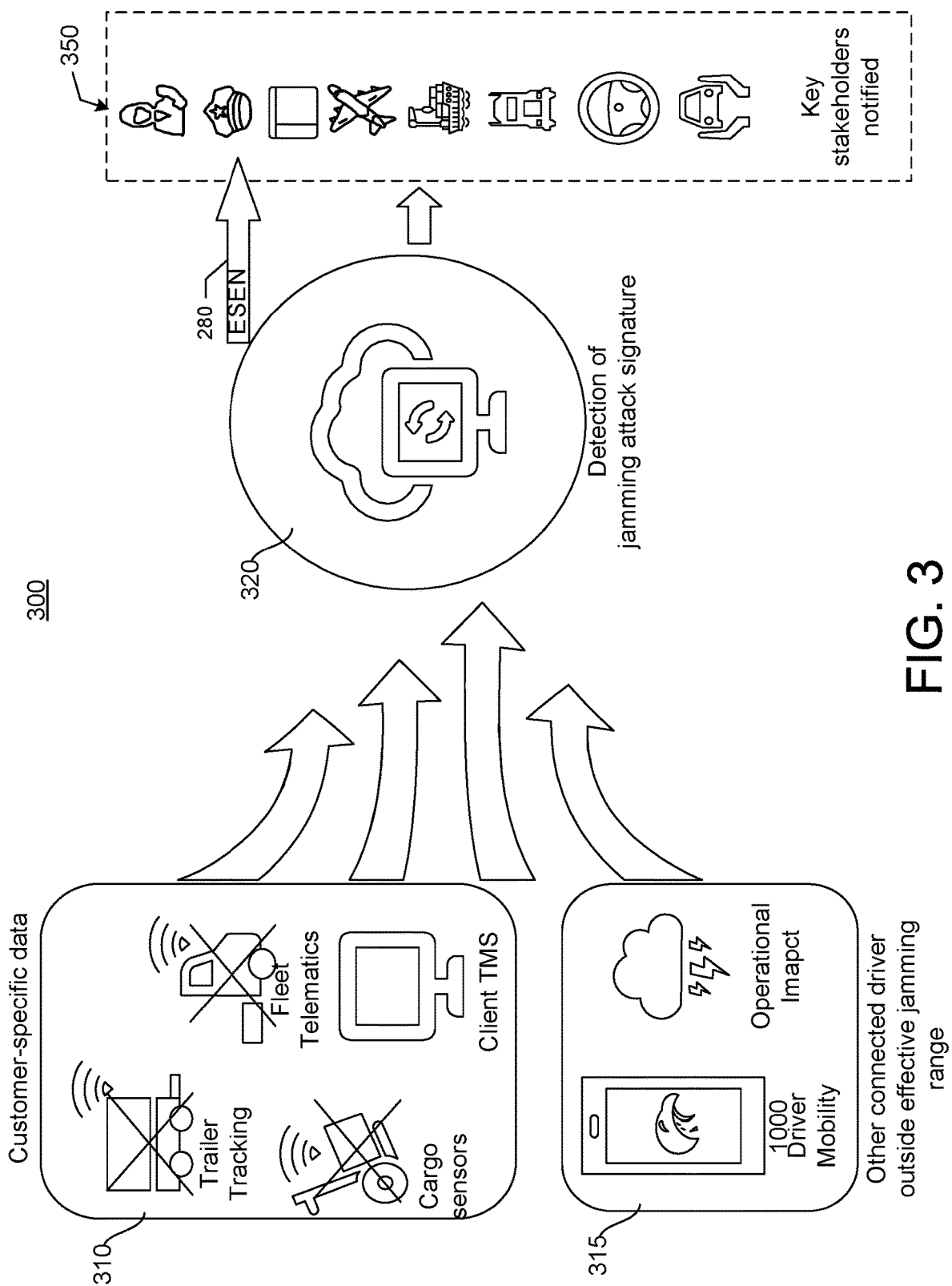
FIG. 3 illustrates an example notification to relevant stakeholders, including LE, in response to a signal jamming attack within a shipping environment having a plurality of different shipment-related entities and other environmental sources that include location sensors with signals received within an aggregation server, in accordance with one embodiment.

FIG. 3 illustrates an example blocked/jammed signal transmission scenario in which the communication infrastructure server or shipment monitoring computing device (i.e., DPS 100 or CSIST Server 100B) losses reception of the geolocation signals associated with multiple shipment-related entities of a single shipment group. As introduced above, the geolocation signals are used to generate and map a corresponding visual affordance, such as a dot that enables tracking and monitoring of the shipment. When a jamming attack occurs, all of the co-located location signals within a shipment are prevented from being transmitted to and received by the data aggregation platform 320. This scenario typically occurs when the operator is not in the or close to the shipment and tractor-trailer, such as at a truck-stop. With the current example, the jamming attack does not affect the operators MDC. In response to detecting this concurrent loss of multiple signals from the co-located shipment-related entities, data aggregation platform 320 generates an appropriate notification, which is forwarded to a selected one or more of the key stakeholders 350. Specifically, LE DPS and/or LE personnel (represented by the police cap) receives ESEN 280 transmitted to LE DPS from aggregation server. Notably, in the example shown, the customer specific data 310 related to the trailer, tractor, and cargo are blocked and are therefore not received by the data aggregation platform 320. However, because the operator MDC 250 is not in the immediate location of the shipment/tractor-trailer and has not been blocked, data aggregation platform 320 transmits the generated notification to the operator MDC 250 to alert the operator via operator MDC 250 of the jamming attack on the shipment.

Figure 4:
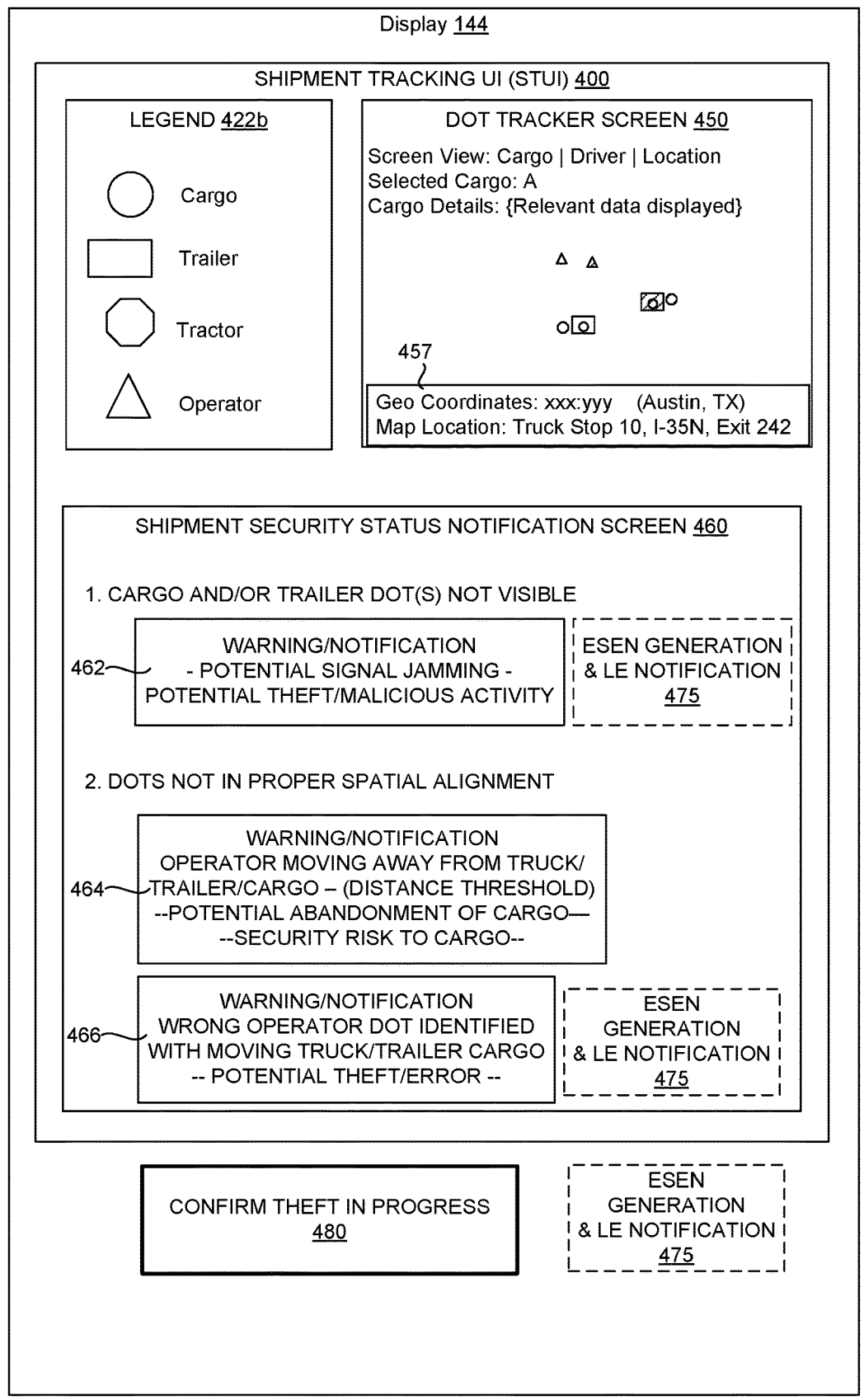
FIG. 4 is a block diagram representation of content presented within an example shipment tracking user interface (STUI) providing the tracking of a single shipment group using co-located visual dots, according to one or more embodiments.

FIG. 4 illustrates an example STUI 400 for a single shipment group that is selected (such as by pointing device) from among multiple available signal groups simultaneously presented within a first STUI (not shown) of a geographic region (not shown). STUI 400 is opened on display 144 as a new window or an embedded window within first STUI 145. STUI 400 includes legend 422b presenting a mapping of the shipment-related entity begin tracked with the corresponding visual affordances or dots that are assigned to that shipment-related entity. STUI 400 also includes a DOT tracker screen 450 within which is displayed a set of dots related to one or more shipment within single geo-location. In the presented embodiment, the geo-location is a truck stop or fuel stop and a first shipment group that is being tracked and for which STUI 400 was opened is presented within DOT tracker screen 450, with the relative position of each shipment-related entity identified thereon. Additionally, for security and other reasons, dots associated with a second shipment group, which is in the same general location as the first shipment group are presented within DOT tracker screen 450 for the first signal group. The second shipment group is identified with hashed dots. In one embodiment, if the operator dot for the second shipment group becomes co-located with and moves in unison with the equipment and shipment dot of the first shipment group, an anomaly is detected and a series of responsive actions are taken to protect the shipment from being taken by the wrong ("unauthorized") operator. DOT tracker screen 450 includes a geo-location coordinate bar that provides the actual geographic and/or GPS and/or map location of the shipment group.

At the bottom of STUI 400 is a shipment security status notification screen 460, which provides a current notification status of the shipment. The notification status can include one or more detected anomalies in the received signals and their corresponding notification/warning messages 462, 464, 466 that is displayed within STUI 450. Three of the possible scenarios that trigger a corresponding notification 462, 464, 466 are presented. While all three notifications 462, 464, 466 are simultaneously shown within STUI, in the illustrated embodiment, it is appreciated that in actual execution, only one notification would be generated and displayed, based on the actual detected anomaly, unless multiple anomalies are simultaneously detected. Of the three notifications, two are provided for situations in which a separate ESEN would be generated and send to LE DPS. Thus, when a signal jamming security event occurs to generate a corresponding warning message 462, STLSU 116 (FIG. 1) triggers ESEN Module (117) to generate ESEN 280 (FIG. 2) and corresponding LE notification 475. Similarly, ESEN Module 117 is triggered to generate ESEN 280 and corresponding LE notification 475 in response to the detected events resulting in notification 466 that a wrong operator has left with the truck and/or shipment. Notably, security status notification screen 460 also provides a selectable confirmation option 480 requesting confirmation that theft is in progress. In one or more embodiments, transmission of the ESEN is held until a confirmation is received from the driver/operator or form a trusted third party that the security event is in fact a theft of the shipment or vehicle. This confirmation is requested to prevent false alarms from being issued to LE, based on a detected situation with the co-located dots that appears to be a security event, but is not actually a security event (such as a theft) that requires involvement of law enforcement. For example, if the driver moving away with the shipment is a known driver who simply mistakenly took the wrong shipment or vehicle, communication with that driver can easily established to ascertain this fact and the shipment can then be returned and turned over to the correct driver, without involving law enforcement. As another example, the driver can provide responsive information (inputted via the driver/operator MCD) that indicates a valid, acceptable reason for the simultaneous loss of the co-located dots.

Referring now to FIGS. 5A-5D and 6A-6D, there are illustrated several different examples of the types of deviations that can be detected by SLTSU 122 based on the presentation and relative spacing of the dots on STIU 145. FIGS. 5A-5D and 6A-6D are a plurality of example dots tracking user interfaces (UI) presenting focused views of a single shipment group that is selected from among the plurality of shipment groups presented within STIU 145 of FIG. 4. In FIG. 5A-5D, each dots tracking UI 500 includes a status notification bar 510 that presents a current status of the corresponding shipment, based, at least in part, on the presence, relative alignment, and movement of the dots representing the shipment-related entities within a shipment group. In addition to the status notification bar 510, each dots tracker UI 500 includes additional information/data about the particular shipment, operator and tractor-trailer equipment, geolocation data, and movement tracking data, each of which can be selected by a user to present additional relevant details about the selected item. Within the various figures, immediate visual notification of an anomaly, deviation, or other condition that triggers a potential security breach is presented as bolded font. In actual implementation, the visual notification can be an applied highlight color or flashing of specific content within the UI 500. Notably, in addition to the notification or alert being highlighted, relevant sets of tracking information related to one aspect of the shipment can also be highlighted (bolded) to direct the monitoring personnel's attention to access that relevant/ associated tracking information.

In one or more embodiments, FIGS. 5A-5D and 6A-6D are generated in response to selection of one STID 241, selection of one shipment grouping 240, or selection of a deviation notification icon within STIU 145, or more specifically, within a DOTS tracking UI 420. The disclosure provides for monitoring and tracking of an unscheduled and/or unexpected separation event, such as one or more of the dots that should remain collocated in the same geolocation moving away from the other dots. As one example, the separation event can include the tractor/truck moving away from the trailer. As another example, the separation event can include one of the cargo dots moving away from the trailer or vice-versa outside of an intended pick-up or drop-off location for that specific cargo. An appropriate set/sequence of notifications and/or responses is generated based on the collected data related to the event.

Figure 5A:
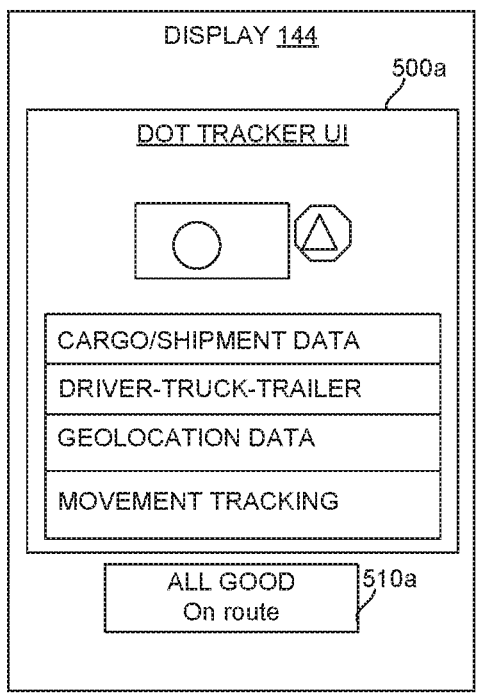
Figure 5B:
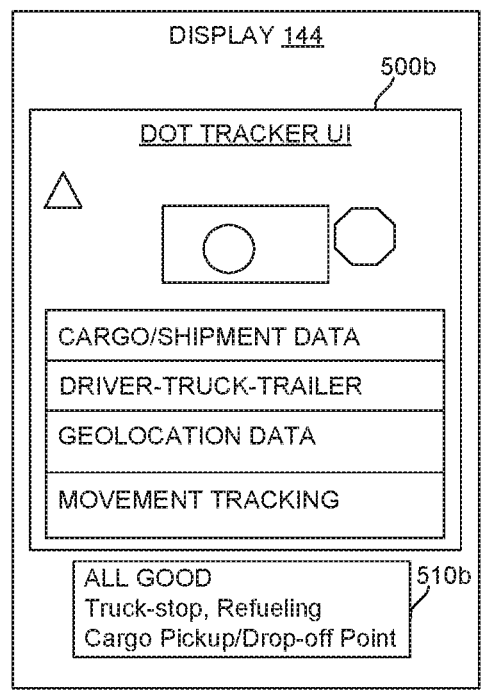
Figure 5C:
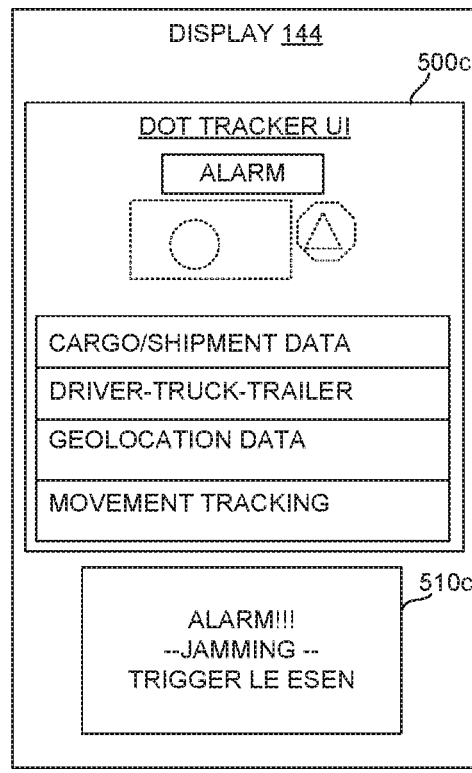

FIG. 5B illustrates second dot tracker UI 500b in which the operator has left the tractor, but is within an acceptable separation distance from the shipment. FIG. 5C illustrates third dot tracker UI 500c in which the location signals for the entire group of shipment-related entities become undetected for a period of time. In at least one embodiment, the concurrent loss of all location signals triggers SLTSU 122 to generate a warning of a jamming attack and notify the operator and others about the detected attack. Thus notification status bar 510c clearly indicates this alert status. Additionally, notification status bar indicates that the generation of a LE ESEN has been triggered. According to one aspect, the amount of time is a programmed parameter that can depend on other information related to the shipping route, geographic location, etc. For example, when the loss of visible dots (i.e., location signals) occurs while the shipment is determined to be moving in a tunnel, the time period can be set to an amount of time expected for the tractor-trailer to exit the tunnel. Other environmental scenarios would trigger a different time period or no delay at all. In the above embodiment, a determination of a potential problem is made (and responsive actions taken) only if a signal loss condition continues/lasts more than a pre-set threshold amount of time. This allows the system to account for detected loss of signal that may be caused by a faulty transmitter or entry into a tunnel located on route, etc.

Figure 5D:
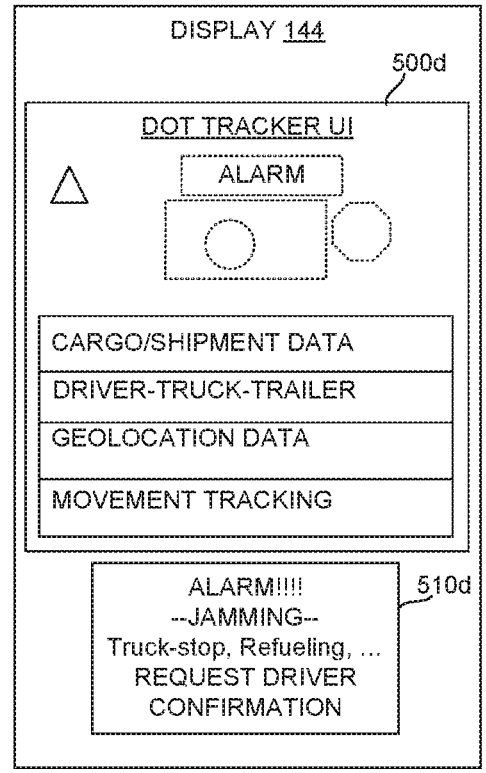

FIG. 5D illustrates fourth dot tracker UI 500d in which the location signals for only some of the group of shipment-related entities become undetected. In this specific scenario, the driver/operator is at a truck stop and away from the tractor-trailer. Notification status bar 510*d* thus provides the warning about the jamming attack, but also presents additional details related to the environment and/or location that may be helpful to counter the attack. In this instance, driver MCD is identified to be outside the area of the blocked signals, and SLTSU 116 issues a request to driver MCD for confirmation that the concurrent loss of signal around the shipment is actually a valid security event (e.g., a theft in progress). ESEN Module 117 does not generate an ESEN and/or does not transmit a generated ESEN to LE DPS until a confirmation signal is received from the driver's MCD.

FIG. 6A illustrates fifth dot tracker UI 600*a* in which a directional movement of the dots for a shipment group indicates that the shipment is being driven off-route. SLTSU 122 triggers an alert that is displayed within notification status bar 610*a* indicating that the shipment is being moved off-route. This trigger can, in one embodiment, require the shipment be a threshold minimum distance (e.g., 1 mile) off route before the notification status bar is updated to reflect the alert. A check of the traffic conditions and other environmental conditions can also be integrated in the determining process to identify if there is a valid reason for the operator to have changed routes.

FIGS. 6B-6C illustrates two scenarios that involve an unscheduled separation of dots in respective dots tracker UIs. In FIG. 6B, sixth dot tracker UI 600*a* shows the operator and trailer moving away from the trailer and cargo at a rate of speed and for a time period that indicates the operator may be abandoning the shipment. Notification status bar 610*b* is updated to provide this warning/alert. In FIG. 6C, a similar alert can be reported via notification status bar 610*c*; however, in this embodiment, the shipment has been removed from the trailer and is being left at a location that is not the delivery destination. DPS 100 therefore determines the separation may likely be an abandonment of the cargo. Alternatively, depending on the location at which the cargo was removed from the trailer, SLTSU 122 can determine that an incorrect drop-off of shipment has occurred. In either scenarios, SLTSU 122 triggers a series of responsive actions, which can include communicating this error to the operator's MDC or the carrier.

FIG. 6D illustrates, via eight dot tracker UI 600*d*, the scenario in which the wrong operator takes a shipment (i.e., either the cargo or the trailer loaded with the cargo). This situation can occur at a shipping port or shipment transit point at which the shipment is left to be picked up by an authorized operator. When the shipment begins to move from port and the authorized operator is not the one who picks up the cargo, STLSU configures DPS 100 to recognize that the location signal of the shipment is co-located with the wrong driver or that the location signal of the shipment is moving away from the transit point without being co-located (and thus move in unison) with the location signal of the authorized operator. It should be noted that this scenario also applies to a theft of a tractor-trailer with onboard shipment, such as when the operator is at a truck-stop or another location outside of the tractor but the shipment is detected moving away from the operator. STLSU 122 configures the DPS 100 to generate a notification of a possible theft of the shipment and displays that notification on notification status bar 610*d*. In one embodiment, this scenario triggers a confirmation protocol by which SLTSU first requests confirmation that the detected event is a security event that requires involvement of law enforcement. Confirmation can be received from driver/operator or other trusted third party. Alternatively, confirmation can be triggered if the driver/operator moving with the shipment or the vehicle is not a known driver/operator who can be contacted directly to ascertain whether the taking of the shipment/vehicle was a mistake.

Figure 7A:
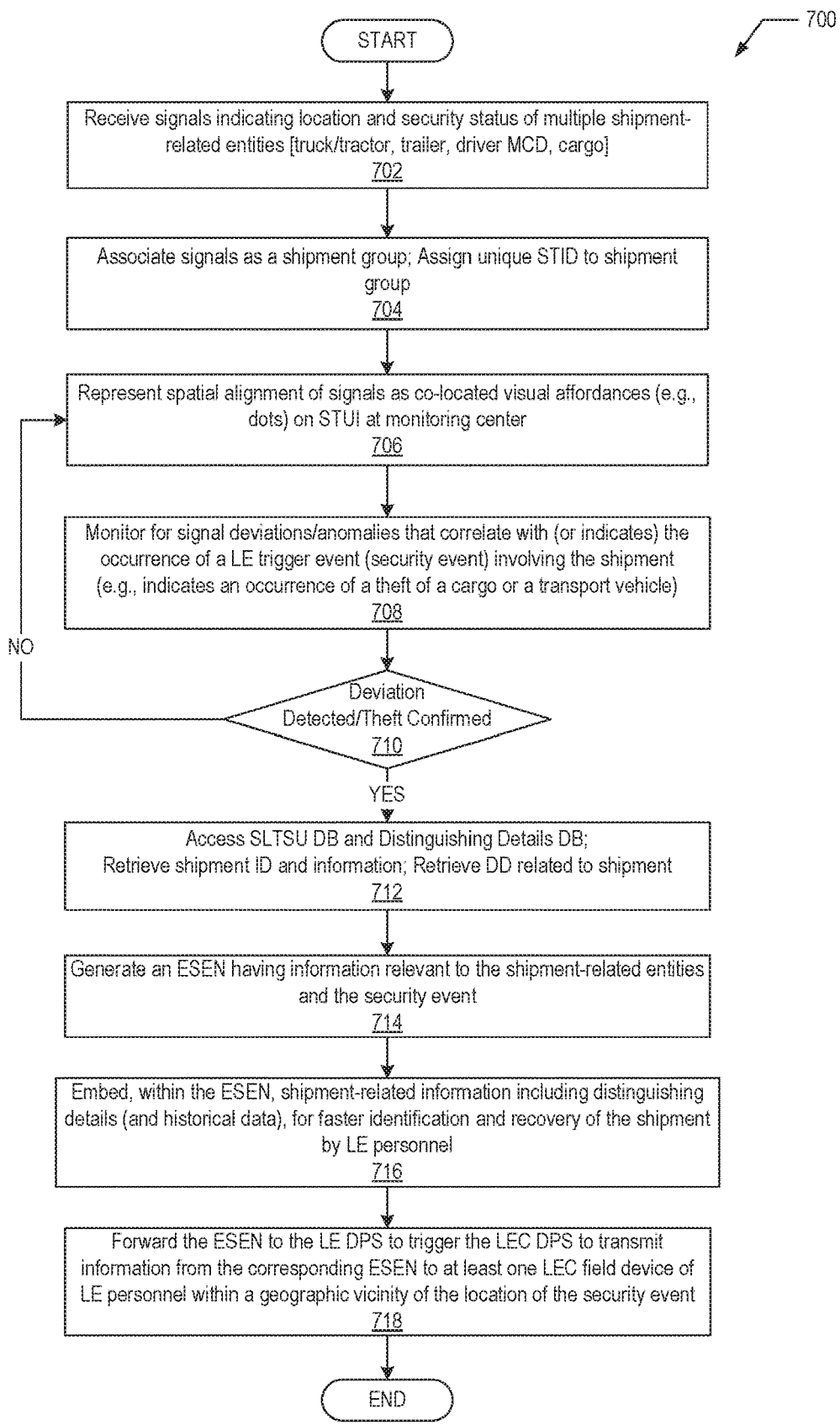
FIG. 7A provides a flow chart illustrating a method for monitoring shipments using co-located dots and responding to detected anomalies or deviations in the expected movement and/or presentation of the co-located dots by triggering generation and transmission of an enhanced security event notification (ESEN) to selected LE Services DPS, in accordance with one or more embodiments.

Referring now to FIG. 7A, there is presented a flow chart of one method by which the devices and infrastructure of the preceding figures are utilized to present certain aspects of the shipment monitoring and security features of the present disclosure. Within the preceding figures, and according to one aspect of the disclosure, there is presented data processing system 100, which includes a memory 110 having stored thereon a shipment location tracking and security utility (SLTSU) 116, which includes ESEN module 117. DPS 100 also includes a display device 144 that enables visual presentation of at least one graphical user interface (UI) 145 generated by the SLTSU 116. DPS 100 further includes at least one network interface device (NID) 160 that enables the DPS 100 to receive and transmit information via one or more communication networks 170/210. DPS 100 further includes at least one processor 105 coupled to the memory 110, the display device 144, and the at least one NID 160. The processor 105 executes SLTSU 116 and ESEN Module 117 to enable DPS 100 to perform the features illustrated by method 700 of FIG. 7.

For simplicity, each of the presented methods (i.e., 700, FIG. 7A, 800, FIG. 8A-8B, etal) are described from the perspective of the device (e.g., DPS 100) performing the various described functions. It is appreciated that the device is configured to perform the various functions based on execution of specific code by the processor of the device (e.g., processor 105). Further, certain of the functions are performed by other components of the device, such as the receiving and transmitting of location signals and notifications, respectively, which are, in part, performed by a network interface or NID (e.g., NID 160 (FIG. 1)).

As provided by FIG. 7, SLTSU 122 enables/configures DPS 100 to receive, via the at least one NID, a plurality of location tracking signals indicating a location of multiple shipment-related entities that are being tracked concurrently as a shipment group (block 702). SLTSU 122 configures DPS 100 to associate the location tracking signals as a shipment group and assign a unique shipment tracking identifier (STID) to the shipment group to track movement of the location tracking signals (represented as co-located dots) relative to each other and to a shipping route 235 (block 704). At block 706, SLTSU 122 configures DPS 100 to present the shipment group 240 as a plurality of co-located visual affordances on a shipment tracking user interface (UI) 145 (FIG. 4), where each location tracking signal is represented by one visual affordance from among the plurality of co-located visual affordances.

DPS 100 is further configured to monitor for any unscheduled deviations in at least one of an expected co-location and an expected geo-location of received updates to the location tracking signals within each shipment group being tracked (block 708). In response to detecting (at decision block 710) an unscheduled deviation, DPS 100 is further configured to identify a specific type of the unscheduled deviation, and, based in part on the specific type of the unscheduled deviation identified, trigger a series of responsive actions to protect the shipment. Specifically, at block 712, DPS 100 is configured to access SLTSU DB and DD DB to retrieve shipment ID and information and distinguishing details related to the shipment. In one embodiment, DPS 100 retrieves from a shipment tracking database, a series of distinguishing data related to one or more of a driver, a shipment, a carrier equipment, and law enforcement historical data. In one or more embodiments, the distinguishing data includes a plurality of relevant data from a group comprising: a description of the carrier equipment; one or more pictures of the carrier equipment; identifying data associated with the carrier equipment, including at least one of a license plate number and a vehicle identification (VIN) number; a copy of a cargo manifest; historical data associated with one or more of a location of the trigger event, a type of cargo, a type of carrier equipment, an origination point of the cargo, a destination point of the cargo, a shipper, and a receiving entity.

Figure 7B:
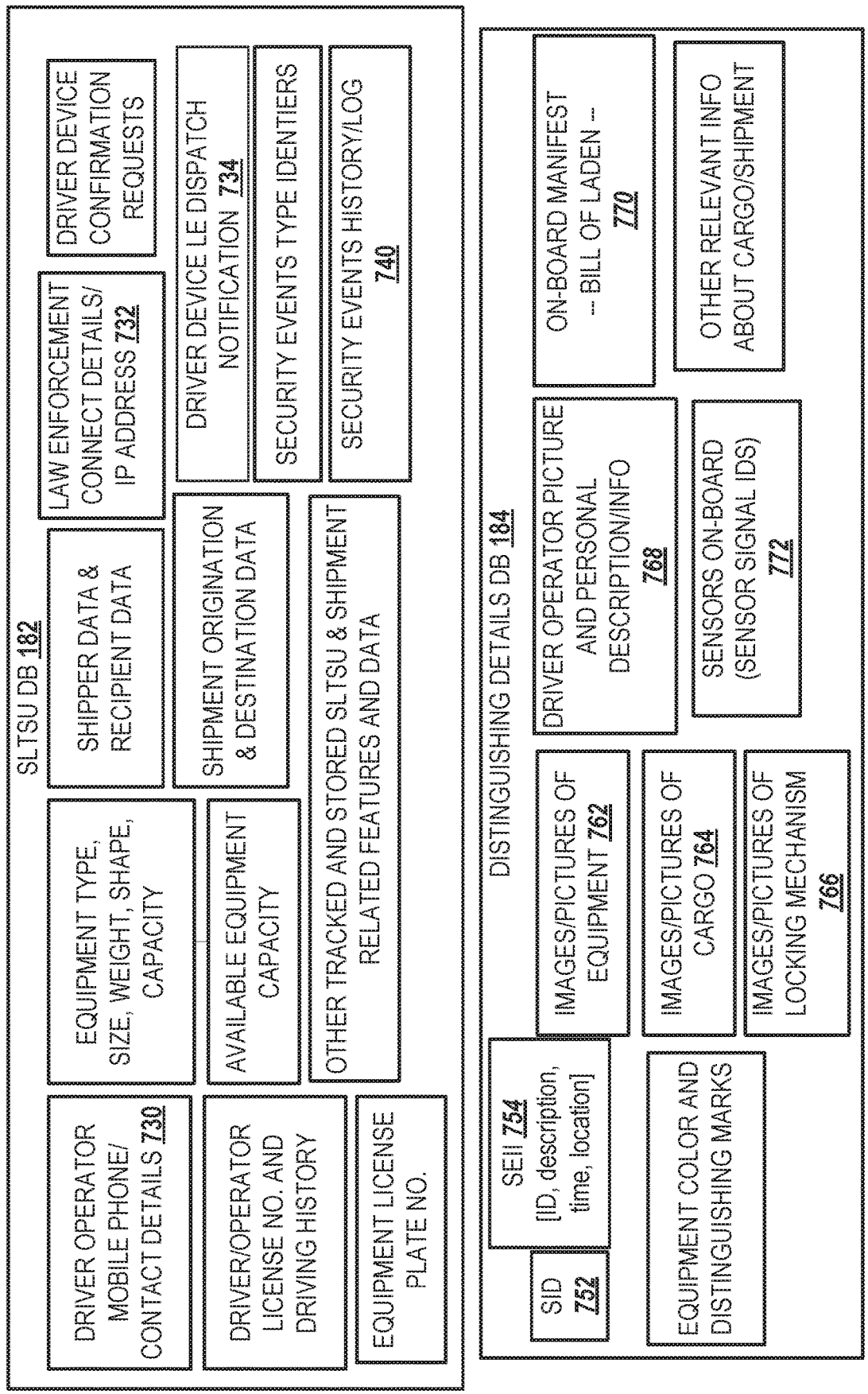
FIG. 7B illustrates example entries in a shipment tracking database that includes distinguishing details utilized to generate the ESEN, according to one or more embodiments.

FIG. 7B provides example SLTSU DB 182 and associated DD DB 184. Each DB 182, 184 includes specific data and information related at least one shipment being tracked. To simplify the description, relevant details of a single shipment are presented in SLTSU DB 182. Thus, SLTSU DB 192 represents only a subset of a larger cloud-based SLTSU DB that provides general data and information that is not specific to any one shipment. The larger SLTSU DB would also maintain specific blocks of data that are specific to a single shipment and associated group of co-located dots. Each such block would be stored with a unique shipment ID or tag that is associated with the shipment group. Among the data/information stored within SLTSU DB 182 are driver/operator mobile phone number 730, LE connection details 732 (e.g., an IP address for LE DPS of the different investigative services teams), driver notification of LE dispatch 734, security events history log 740.

DD DB 184 maintains specific details associated with only the shipment-related entities of a specific, single shipment group being monitored. Example DD DB 184 includes shipment ID 752, security event ID 754, images/pictures of the equipment (tractor and trailer) 762, cargo 764, and locking mechanism 766, picture and other personal description of information about the driver/operator 768, copy/image of the shipment manifest or bill of laden 770, and IDs of the location tracking sensors 772. Other distinguishing details are also provided, and the specific ones of the details presented in an ESEN change based on the security event and/or other factors considered within the code provide by SLTSU 116 and/or ESEN Module 117. It is appreciated that a different DD DB or repository of data is provided for each shipment and stored in a larger storage repository maintaining the various DD DBs for all shipments being tracked for potential occurrence of a security event. Also, in one embodiment, the information within DD DB 116 can be stored at different locations, such as within a general database of CSIST, and compiled only on request from ESEN Module during generation of an ESEN.

Returning to FIG. 7A, DPS 100 is configured by ESEN utility to generate an ESEN having information relevant to the shipment-related entities and the security event (block 714). DPS 100 embeds within the ESEN shipment related information including distinguishing details and historical data that will enable faster identification and recovery of the shipment by LE personnel (block 716). DPS 100 forwards the ESEN to the LE DPS (block 718). LE DPS (of TRIS Team) evaluates a best option for recovery of the shipment, retrieves relevant historical data based on an analysis of the event, location, and known or deterministically determined patterns, and updates the ESEN with additional information. The LE DPS then transmits/communicates the updated ESEN to selected one or more LE dispatch servers (selected from among a plurality of available dispatch servers for different groups of local LE) for forwarding to associated LE field devices of LE personnel within a geographic vicinity of a location of the security event. Then, method 700 completes at end block.

In generating the ESEN, SLTSU 116 configures DPS 100 to retrieve specific distinguishing details that are appropriate for the specific security event being responded to. The set/sequence of notifications and/or responses are selected based on the stored and/or collected data directly associated with the theft event. For example, if the theft event was of a vehicle carrying cargo, one or both of which was being tracked via a sensor, the notification would automatically include one or more pictures of the vehicle, the VIN number, the vehicle tag numbers, the location where the vehicle was stolen, the tracking ID for the vehicle, owner and/or driver details for the vehicle, etc. However, if only the cargo was stolen, then the notification may not initially present as much detail about the vehicle and instead provide a description and pictures of the cargo and other details related to the cargo. Information relevant to the theft itself, such as a picture of the lock and the owner or intended recipient of the cargo would also be provided instead of the vehicle specific details.

It should be appreciated that the cycle of monitoring the shipment will continue until the shipment is delivered to the end destination or other measures are taken to stop monitoring the shipment group. Also, in one embodiment, the detection of and response to a deviation includes the DPS 100 determining, from metrics associated with the detected change and previous patterns of behavior of input signals, whether the detected change indicates a potential bad and/or malicious and/or illegal and/or financially detrimental act directed towards the shipment that can be resolved by one or more actions, including informing law enforcement. In response to determining that the detected change is indicative of a bad act associated with the shipment, DPS 100 identifies the event as a security event and triggers responsive actions to (i) prevent the occurrence of the security event or (ii) to mitigate/reduce (a) a timing of a response to or resolution of the security event and/or (b) an effect on the shipment caused by the security event.

Section B: Law Enforcement DPS—Security Event Investigative Services

Figure 8:
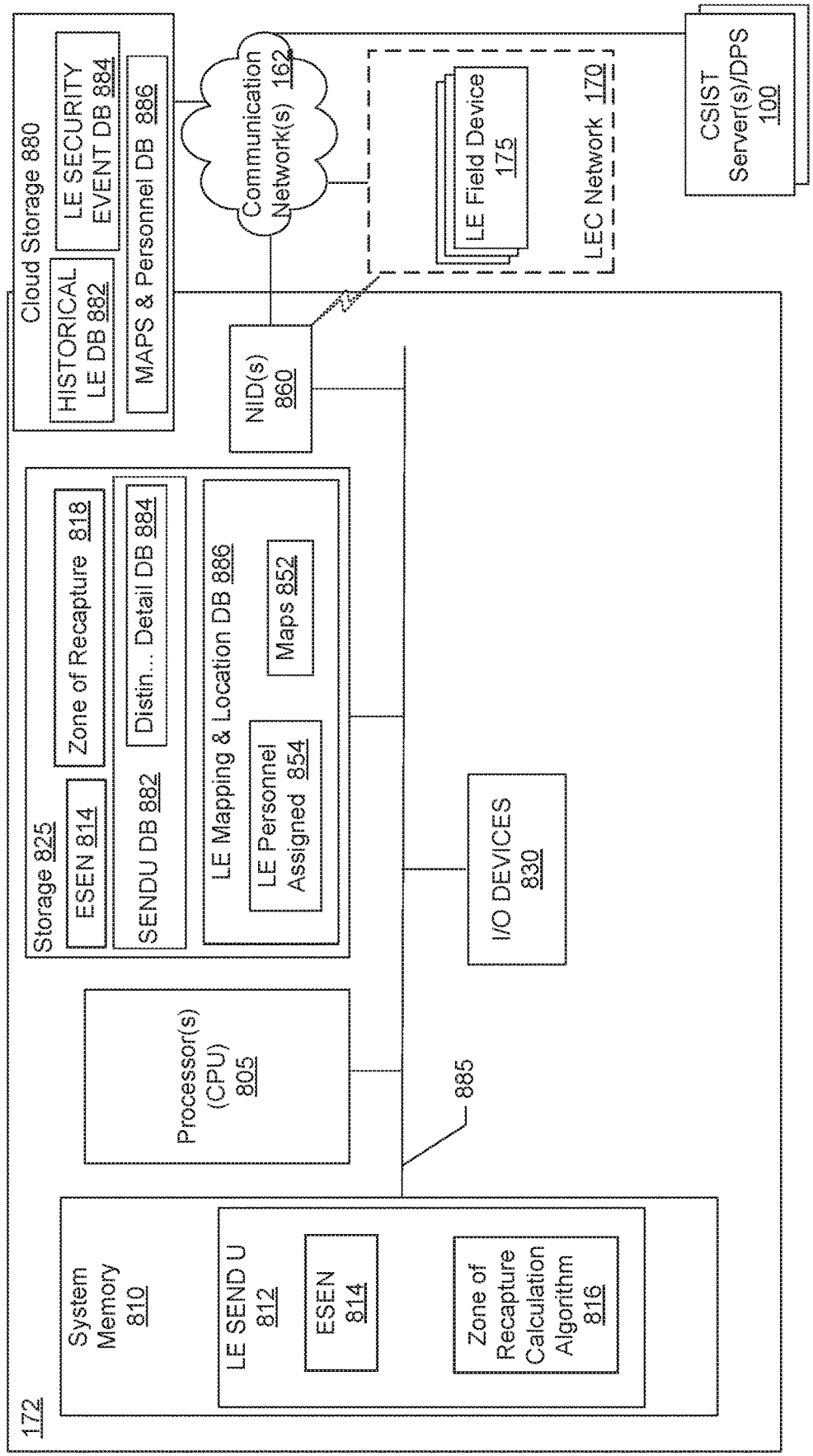
FIG. 8 is a block diagram representation of a LE DPS, connected via an LE connect network to LE dispatch servers and multiple LE field devices to enable one or more of the features described herein, in accordance with the one or more embodiments.

FIG. 8 provides a block diagram representation of example law enforcement (LE) data processing system (DPS) 171. Generally, LE DPS 171 includes system memory 810 having stored thereon LE security event notification and dispatch (SEND) utility 812 that enables the LE DPS 171 to generate and forward an updated enhanced security event notification (ESEN) 814 to LE dispatch server 172. Memory 810 also includes a zone of recapture algorithm 816 that enables calculation of a geographic zone within which a stolen shipment (cargo and/or transport vehicle) will likely be recovered, based on a time and a location of the occurrence, and other factors such as the type of cargo, vehicle, road conditions, traffic conditions, known historical behavior of thieves with similar modus operandi, etc. Memory 810 further includes historical data retrieval algorithm 818 that enables a search of historical data DB 882 to retrieve relevant information to assist in resolving the security event. Memory 810 further includes LE dispatch server selection utility 819 which is used to determine which LE dispatch server to select to dispatch the updated ESEN.

LE DPS 171 also includes at least one network interface device (NID) 860 by which LE DPS 190 receives and transmits information over one or more communication networks 180. Communication network 162 provides access to cloud storage 880 within historical LE data 882, LE security event DB 884, and LE personnel location DB 886 are stored for use by LE DPS 171. Relevant portions of each database and additional data are maintained within local storage 825. As shown, storage 825 includes ESEN 814, zone of recapture 817, and SENDU DB 882, which includes distinguishing data 884 retrieved from ESEN received from DPS 100. LE mapping & location DB 886 includes assigned LE dispatch servers and LE personnel data 854 and interactive geographic maps 852. LE DPS 171 also communicates via LE connect (LEC) network 170 to a plurality of LE dispatch servers 172 communicatively connected thereto. LE DPS 171 further includes at least one processor 805 coupled to system memory 810 and to the at least one NID 860. The at least one processor 805 executes the SEND utility 812, which configures LE DPS 171 to perform the functions provided within method 900 of FIG. 9. The following description of method 900 is provided with reference to the preceding figures and in particular to FIGS. 2A-2B and 7B and with continuing reference to FIG. 8

Method 900 begins at start block and proceeds to block 902 at which LE DPS 171 receives, from a shipment tracking system (generally DPS 100) communicatively coupled to LE DPS 171 via the one more communication networks 162, an ESEN 280 (FIG. 2) that includes information (754) identifying a security event, a location at which the security event occurred, and additional distinguishing details (from DD DB 184) corresponding to entities involved in and/or affected by the security event. Method then includes LE DPS 171 identifying a geographic location of the security event and selecting one or more LE dispatch servers 172, which provides notifications of security events (e.g., an updated ESEN) to LE personnel (with LE field devices) located within the current zone of recapture (block 904). In one embodiment, LE DPS 171 first calculates the zone of recapture before selecting the LE personnel. Method then includes LE DPS 171 embedding, within the updated ESEN to be transmitted to LED dispatch server 172 and eventually to LE field device 175 of one or more LE personnel 295 (i) the security event identifying information (SEII) 754, including a description of the security event, the location at which the security event occurred, and a time of occurrence 836 of the security event, (ii) a calculated zone of recapture 270, and (iii) additional distinguishing details (184) providing descriptive data about one or more of the shipment, the cargo, the transport vehicle, the driver, the geographic location, and other data that facilitates more effective search and recovery operations by the LE personnel 295 of the cargo and the transport vehicle (block 906). Method 900 can optionally include LE DPS 171 embedding signal IDs for the location sensors for shipment-related entities and the WCD of the operator/driver (block 908).

At block 910, LE DPS 171 selectively transmits (indirectly through intervening selected LE dispatch server 172) the information with the distinguishing details from the ESEN 280 to at least one LE field device 195 of an LE personnel 295 within one of (i) a geographic vicinity of the location of the security event and (ii) a calculated zone of recapture 270. The additional distinguishing details enable LE personnel 295 (FIG. 2) to receive a more complete set of relevant details at the LE field device 175 that enables more accurate identification, tracking, and resolution by the LE personnel 295 of the security event. Method 900 then includes monitoring for receipt of input related to interim and final resolution of the security event (based on input received from the LE field device) (block 912). Method 900 further includes updating the historical data with new data corresponding to the security event and the resolution of the security event, and storing the updated historical data in the LE historical DB (block 914).

According to one embodiment, the security event involves theft of at least one of a cargo 242 and a transport vehicle 246 associated with a shipment of the cargo, the cargo and transport vehicle being tracked by one or more location sensors (262, 264, 266), and the distinguishing details of the ESEN 280 includes shipment-related information. The SEND utility 812 further enables the LE DPS 171 to retrieve the distinguishing details (184) from the received ESEN 280, identify a geographic location of the security event, and select one or more LE dispatch servers 172 communicatively connected to LE personnel 295 whose current location is proximate to or within a current zone of recapture 270 to the geographic location.

Accordingly, LE DPS (of TRIS Team) evaluates a best option for recovery of the shipment, retrieves relevant historical data based on an analysis of the event, location, and known or deterministically determined patterns, and updates the ESEN with additional information. The LE DPS 171 then transmits/communicates the updated ESEN to selected one or more LE dispatch servers (selected from among a plurality of available dispatch servers for different groups of local LE) for forwarding to associated LE field devices of LE personnel within a geographic vicinity of a location of the security event.

Section C: Driver Mobile Communication Device for Capturing Distinguishing Details and Providing Security Event Confirmation & Recovery Support Referring now to FIG. 10A, there is illustrated an example user communication device, which is presented as mobile communication device (MDC) 250. MCD 250 is an operator/driver communication device and can interchangeably be described as such. Specifically, FIG. 10 depicts a 2-dimensional view as well as a block diagram representation of the component makeup of mobile communication device (MCD) 250. MCD 250 operates within a wireless communication network and serves as the electronic processing and communication device within which several of the operator-associated features of the disclosure can be implemented. According to the general illustration, MCD 250 is designed to communicate with other devices via one of a wireless communication network, which may be included within data communication network 210 (FIG. 2). MCD 250 can be one of a plurality of different types of devices, including but not limited to, a mobile cellular phone or smart-phone, a laptop, a net-book, an ultra-book, and/or a tablet (e.g., an iPAD®), or other computing device configured to enable wireless connectivity. The utilized device includes the necessary hardware and software to enable wireless-enabled communication between MCD 250 and a network via which information and/or data and voice communication required to implement the various features described herein to facilitate security of shipments via the general location signal communication environment (FIG. 2B) and execution of specific module and applications described herein.

Referring now to the specific component makeup and the associated functionality of the presented components, MCD 250 comprises processor 1010, which connects via a plurality of interconnects (illustrated by the bi-directional arrows) to a plurality of other functional components of MCD 250. Processor 1010 can be an integrated circuit that includes one or more programmable microprocessors and a digital signal processor (DSP). Processor 1010 controls the communication, program code execution, power mode control, time synchronization, and other functions and/or operations of MCD 250. These functions and/or operations thus include, but are not limited to, application data processing and signal processing.

Connected to processor 1010 is storage 1015, memory 1020, input/output (I/O) devices and communication mechanisms 1055. Memory 1008 can include volatile memory and/or non-volatile memory. During device operation, one or more executable applications can be stored within memory 1020 for execution by processor 1010. For example, memory 1020 is illustrated containing local SLTSU App 1022, which is a downloadable app or utility that executes on MCD 250. SLTSU App 1022 includes shipment tracking user interface (STUI) 1024 and biometric verification module 1026, which is utilized to authenticate operator and provide access to certain secure functions of MCD 250. As an example, a voice or fingerprint confirmation may be required before allowing a operator/driver to pick up a high value shipment, so that only a specific pre-authorized operator/driver can perform the transportation of that shipment. Thus, for example, a DOD shipment will be released only to a DOD cleared carrier.

Memory 1020 further includes shipment compliance tracking utility 1028, which can provide access to available maps and which utilizes a GPS sensor or other location detection sensor or function of MCD to report an exact location of MCD 250 back to CSIST server (DPS) 100B. Within shipment compliance tracking utility 1028 is DOTS tracking utility (or SLTSU) 1030, which is a local operator device version of and performs similar functions as SLTSU 122 (FIG. 1). Memory also includes LE connect module 1032 which provides connection protocols (e.g. IP addresses, phone and messaging connection details, etc.) with LE personnel and LE DPS and LE field devices.

Memory 1020 also includes shipment data and confirmation utility 1034, jamming detection module 1036, and un-authorized operator detection module 1038. Finally, to support LE connect features, memory 1020 includes distinguishing data capture and input module 1025 and security event confirmation module 1039. The functionality associated with and/or usage of each of the software modules will become evident by the descriptions provided herein. It is appreciated that the various software modules can be independent modules that communicate with each other via processor execution of respective program code.

As provided, storage 1015 contains a local version of SLTSU DB 1018 that can include some of the operator login credential and biometric information to allow for local processing of the operator's login to a CSIST framework, in one or more embodiments. Additionally, storage 1015 includes distinguishing details DB 1019. SLTSU DB 1018 can include some of the information provided within SLTSU DB 182 (FIG. 7B), while DD DB 1019 can contain similar information as provided in DD DB 184 (FIG. 7B).

MCD 250 can include a subscriber identification module (SIM) or other similar feature that provides unique identification information of the carrier that owns or utilizes MCD 250. In order to allow MCD 250 to synchronize operations and/or provide time data, MCD 250 also includes system clock (not shown). MCD 250 also comprises a plurality of input/output (I/O) devices 1040. I/O devices 1040 include, as input devices, camera 1042, microphone 1044, touch screen and/or touch pad and/or keypad 1046, and biometric sensor 1052 and, as output devices, display 1048 and speaker 1050, and others. I/O devices, and in particular camera 1042, can be utilized to capture images/pictures of shipment related entities and stored the captured image to DD DB 1019.

FIG. 10B illustrates an example login and shipment setup UI of STIU 1024. Within STIU 1024 a series of input selections are presented on display 1048 to prompt the driver/operator to provide general shipment details 1092, driver information and distinguishing data 1094, and preferences 1096. Driver/operator enters the corresponding information via direct input (e.g., using touch/keypad) by download from STLSU DB 182, or via device capture, using scanner 1035 and/or camera 1042. For example, driver enters distinguishing data of the pictures of the cargo, the lock, and the tractor and the trailer (or other transport vehicle) using camera.

The login and shipment setup UI of STIU 1024 enables user input and/or capture of specific distinguishing details including one or more of a vehicle identification (VIN) number, vehicle tag numbers, a location where the vehicle was stolen, a tracking ID for the vehicle, and owner and/or driver details for the transport vehicle, including a driver's license number, address, and the driver's mobile device number, and one or more pictures of the cargo, the transport vehicle, the driver, and the driver's license. As shown, the distinguishing details includes one or more pictures and information associated with the cargo, the transport vehicle, and a driver, and the theft event. Information about the driver and vehicle may be downloaded from the driver profile stored in SLTSU DB. Pickup location and time and destination details may be inputted by scanning a bar code on the cargo or on the bill of laden. Once received, the distinguishing data and other data are linked to the shipment via a shipment ID or tag within storage 1015. The data is also be uploaded to STLU DB 182 and specifically to DD DB 184 for use in generating an ESEN in response to occurrence of a security event. In embodiments that support direct communication between driver's MCD 250 and LE field device 175, distinguishing data for a received notification of security event can be requested by LE field device 175 and transferred directly from driver's MCD 250 to LE Field device 175.

According to one aspect of the disclosure and as illustrated by FIG. 10A, MCD 250 supports at least one and potentially many forms of wireless, over-the-air communication, which allows MCD 250 to transmit and receive communication, including location signals, with at least one second device and/or an externally located network. To support wireless communication, MCD 250 includes one or more of the following communication components: wireless network communication module 1060 (which can include a transceiver with connected antenna, both not expressly provided), near field communication (NFC) transceiver module 1062, wireless fidelity (WiFi) module 1064, and Bluetooth® transceiver 1066. It is appreciated that MCD 250 can also include components for wired communication, such as modem and Ethernet modules (not shown). Collectively, these wireless and wired components provide a communication means or mechanism 1055 by which MCD 250 can communicate with other devices and networks. To enable location-based services within/on the device, MCD 250 also includes a location service module, such as a GPS module, without limitation.

MCD 250 establishes communication with the at least one other device, such as LE field device 175, via over-the-air signal transmission, following the exchange of specific authentication and/or access credentials. The communication between MCD 250 and the second devices can be via near field communication, Bluetooth, infrared (IR) transmission, and others, without limitation. As a wireless device, MCD 250 can transmit data over a wireless network (e.g., a Wi-Fi network, cellular network, Bluetooth® network (including Bluetooth® low energy (BLE) networks), a wireless ad hoc network (WANET), or personal area network (PAN)). In one embodiment, MCD 250 may be further equipped with an infrared (IR) device (not pictured) for communicating with other devices using an IR connection. In another embodiment, MCD 250 may include a short-range wireless device, including, but not limited to, a near field communication (NFC) device. In still another embodiment, MCD 250 may communicate with one or more other device(s) using a wired or wireless USB connection.

Similar to the execution of STLSU 122 by processor 105 of DPS 100, processor 1010 of MCD 250 executes local STLSU or Dots utility 1030, which enables MCD 250 to track a series of dots corresponding to a shipment assigned to the operator/carrier for transporting to one or more respective destinations. MCD 250 receives a location signal for each of the shipment and a tractor trailer. MCD 250 co-locates and group the dots (each representing unique tracking affordances) of the shipment (a first tracking affordance) with that of the shipping vessel (operator equipment or tractor-trailer) (a second tracking affordance) and the MCD (a third tracking affordance). Dots of the MCD 250 thus corresponds to the authorized operator for the shipment. In one embodiment, the location signals and other data related to the shipment are received from a data aggregator, such as CSIST server 100B. In at least one embodiment, the data for all other entities of the shipment group is locally received and aggregated by processor execution of Dots utility 1030.

In one embodiment, MCD 250 locally tracks the current shipment group of co-located dots and can identify deviations and anomalies, similar to the tracking and monitoring previously described with DPS 100. As shown in the 2D image of MCD 250, depending on the type of deviation, MCD 250 outputs an alert 1080, which can be an audible and/or a visible alert. The alert informs the operator/driver that a security event is occurring. Simultaneously, DPS 250 provides a description of the security event 1082 on display 1048. MCD 250 also provides confirmation request 1085 which the driver/operator is required to select once the driver/operator confirms a security event is valid, e.g., a theft or theft in progress of the cargo and/or the transport vehicle or the entire shipment.

Figure 11:
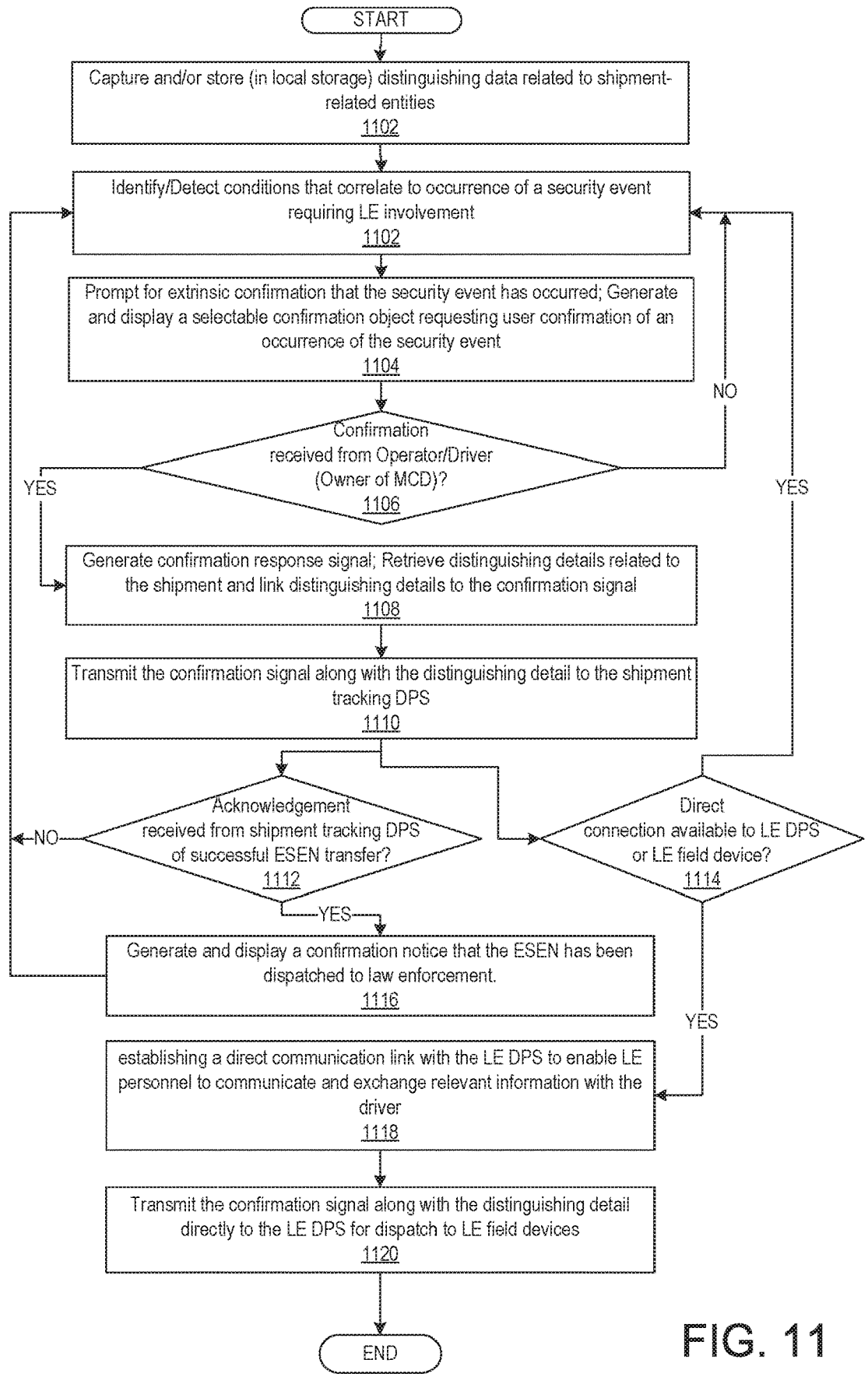
FIG. 11 is a flow chart illustrating a method by which the MCD provides localized shipment tracking and confirmation of an occurrence of a security event, according to one or more embodiments.

FIG. 11 illustrates a method 1100 by which MCD 250 operates as a localized shipment tracker and notification device. Generally, method is performed by processor 1010 executing code of the location signal tracking utility (SLTSU App 1030), which configures MCD 250 to perform the various processes of method. Method 1100 begins at start block and proceeds to block 1102 at which DPS captures and stores distinguishing data related to shipment-related entities. DPS monitors a geographic location of a plurality of signals associated with a cargo and a transport vehicle carrying the cargo and identifies or detects (or determines), from a current state of the plurality of signals, a condition that correlates to an occurrent of a security event that requires LE involvement (block 1102). Method includes DPS 250 prompting for extrinsic confirmation that the security event has occurred by generating and displaying a selectable confirmation object requesting user confirmation of an occurrence of the security event (block 1104). At decision block 1106, DPS 250 determines whether confirmation is received from the operator/driver that the detected event is a security event that requires LE involvement. If no confirmation is received at block 1106, method returns to block 1102 to continue monitoring for conditions that correlate to possible security events. In one alternate embodiment, the event details is recorded and transmitted to CSIST DPS 100 (FIG. 1A-2B), which makes a decision as to what type of responsive action, if any, is required.

In response to receiving extrinsic confirmation that the security event has occurred, method 1100 includes generating a confirmation response signal, retrieving distinguishing details related to the shipment, and link the distinguishing detail to the confirmation signal (block 1108). Method 1100 then includes transmitting the confirmation signal along with the distinguishing detail to the shipment tracking DPS (100), where the distinguishing detail can be utilized by the shipment tracking DPS (100) to generate an enhanced security event notification (ESEN) 280 that is transmitted to a law enforcement (LE) DPS 172 for dispatch to LE field devices 175 (block 1110).

At block 1112, method 1100 includes determining if an acknowledgement is received from the shipment tracing DPS of the successful transfer of the ESEN. In response to receipt of an acknowledgement signal from the shipment tracking DPS, method 1100 includes generating and displaying, on display 1048 a confirmation notice that the ESEN has been dispatched to law enforcement. Method then returns to block 1102 to continue monitoring for the occurrence of security events.

Along a parallel, alternate track, from block 1110, method 1100 transitions to block 1114 includes a determination of whether a direct connection is available to LE DPS 171 or a local LE field device 175. In response to MCD 250 being able to establish a direct connection to law enforcement, method 1100 includes establishing a direct communication link with the LE DPS to enable LE personnel to communicate and exchange relevant information with the driver (block 1118). Method 1100 further includes transmitting the security event along with the distinguishing detail directly to the LE DPS for dispatch to LE field devices (block 1120). In one embodiment, the decision to transmit the event details and other distinguishing details to law enforcement is based on a driver/operator selection of LE notification button 1087 presented to operator/driver on display 1048.

According to another embodiment, a method is provided for efficient driver notification to law enforcement to a theft event involving the driver's vehicle and/or cargo being transported by the driver. The method includes a processor of a driver mobile device executing a theft detection and notification utility to cause the mobile device to: detect conditions associated with a location monitoring application tracking the cargo and transport vehicle that indicate a theft event has occurred (or is occurring); generating a graphical user interface with details about the theft event and displaying the GUI on a display of the mobile device; presenting within the GUI a user selectable confirmation option to generate and forward a notification of the theft event once the driver confirms that the theft event has occurred; and in response to receiving the user verification, transmitting a notification of the theft event to a background server communicatively connected to the mobile device to enable the notification to be communicated to law enforcement personnel. The method also includes: providing within the transmitted notification specific data associated with one or more of a current location, the driver, the driver's mobile device number, the shipment, and the carrier equipment; and generating a completion signal identifying that the notification has been dispatched to law enforcement. The method further includes enabling driver input of specific details related to the theft event and one or more other information to assist with recovery of the shipment and/or carrier equipment.

Accordingly, the illustrative embodiments of the present disclosure enable enhanced notification of a theft event to law enforcement (LE) personnel. With the ability to directly connect the driver device to law enforcement, the disclosure substantially reduces delay times in getting relevant information associated with the stolen items to the LE personnel to allow the LE personnel to more quickly respond to the theft event and recover the stolen items.

D: Enhanced Law Enforcement Field Device, with ESEN Access Features

Figure 12A:
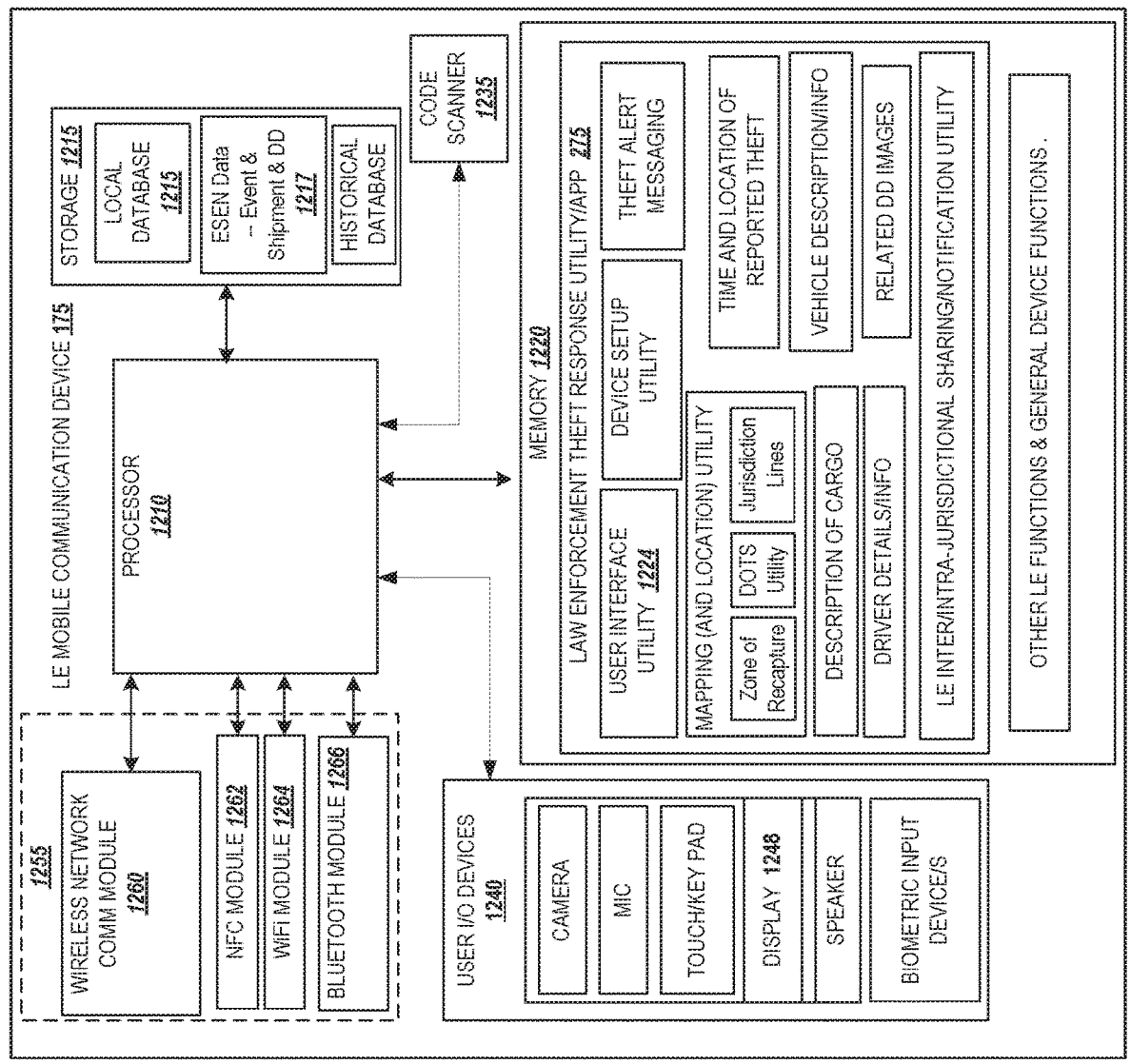
FIG. 12A illustrates an example LE mobile communication device (LE field device), equipped with a LE theft response utility/app to enable real-time receipt of theft event notification and relevant information about the theft event to enable efficient information dissemination, in accordance with one or more embodiments.
Figure 12A:
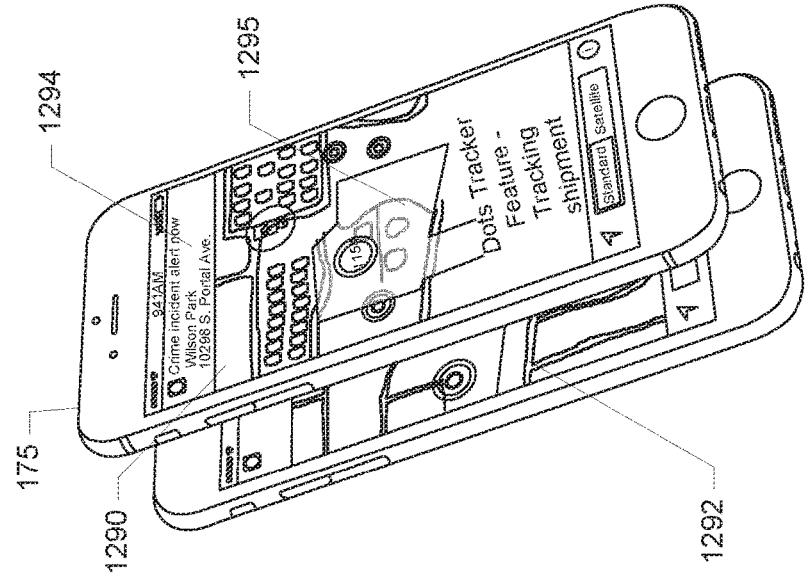
Figure 12B:
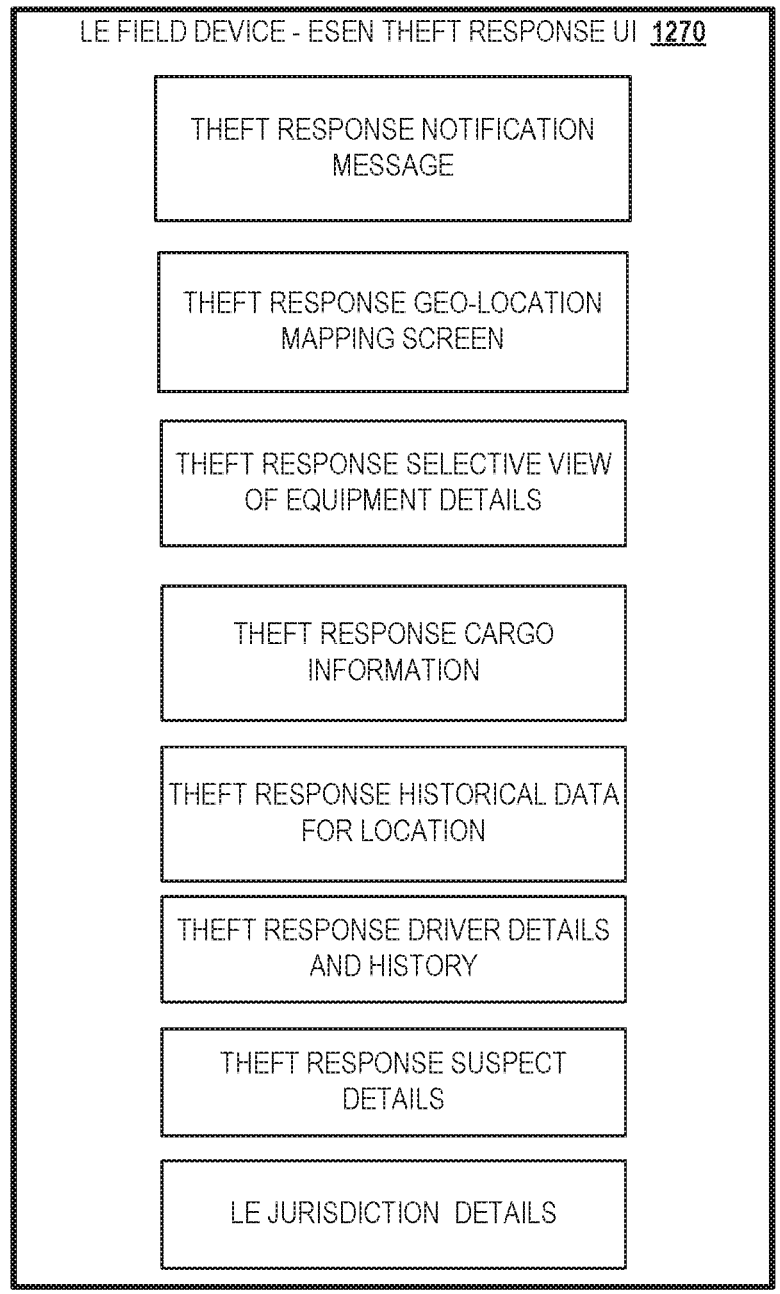
FIG. 12B illustrates example functional modules provided within the LE field device following receipt of an ESEN having distinguishing details to facilitate identification of stolen items and enable easier assimilation of relevant data by the receiving LE personnel, according to one or more embodiments.

FIG. 12A-12B illustrates components of an enhanced LE field device 175, according to one or more embodiments. Law enforcement (LE) field device 175 is presented having similar physical components as MCD 250, but configured with different executable modules, applications, and data to enable the device to operate as an LE field device and provide the LE aspects of the disclosure. Because of the similarities in the hardware components, only those components that are required to describe the operations of LE field device 175 are expressly introduced within the description. LE field device 175 includes memory 1220 having stored thereon a LE Theft Response (LETR) utility (or LETR app) 275. LETR utility 275 includes a plurality of executable modules and data that enable operation of LE field device 175 to receive an ESEN and support recovery operations for the stolen items by LE personnel using LE field device 175. As shown, those modules and data include user interface (UI) 1224 on which shipment details, geographic mapping, and distinguishing details can be presented. As provided by FIG. 12B, LETR UI 1224 can present a series of different information associated with a theft response, including selective views of specific information related to cargo, driver, transport vehicle, shipment, etc.

LE field device 175 includes network interface (NI) (generally 1255) that enables exchange of communication between LE field device 175 and LE connect (LEC) network 170 (FIG. 1) having LE DPS 171 associated therewith. In one embodiment presented herein, NI 1255 also enables LE field device 175 to communicate with a WCD 250 of an operator/driver associated with a shipment begin tracked by LE personnel. LE field device 175 includes at least one input device (1240) that enables entry of a selection or entry of information by LE personnel 295 (FIG. 2). LE field device 175 also includes display 1248 utilized to present a graphical user interface, LETR UI 1224 displaying notifications 1291 of security events and security event information 1295, including location maps 1292 and distinguishing details (see FIGS. 13-14).

LE field device 175 further includes processor 1210 communicatively connected to the various other components. Processor 1210 executes code of LETR utility 275, which configures LE field device 175 to receive, via the NI 1255, from LE DPS 190 (or from MCD 250, in an alternate embodiment), information from an enhanced security event notification (ESEN) 1217 about a security event. In one or more embodiments, the received information includes (i) security event identifying information (SEII), including a description of the security event, a location at which the security event occurred, and a time of occurrence of the security event, (ii) a calculated current zone of recapture, and (iii) additional distinguishing details. The information received from the ESEN 1217 enables more efficient assimilation of search information and a more directed and accurate search operation by LE personnel 295. The LETR utility 275 also configures LE field device 175 to display portions of the information on display device 1248 to notify the LE personnel 295 of the security event. The LETR utility 275 further configures LE field device 175 to selectively display other portions of the information, based on input received via the at least one input device 1240, and to retrieve and present additional details from the distinguishing details 1217 selected from within the information.

Figure 13:
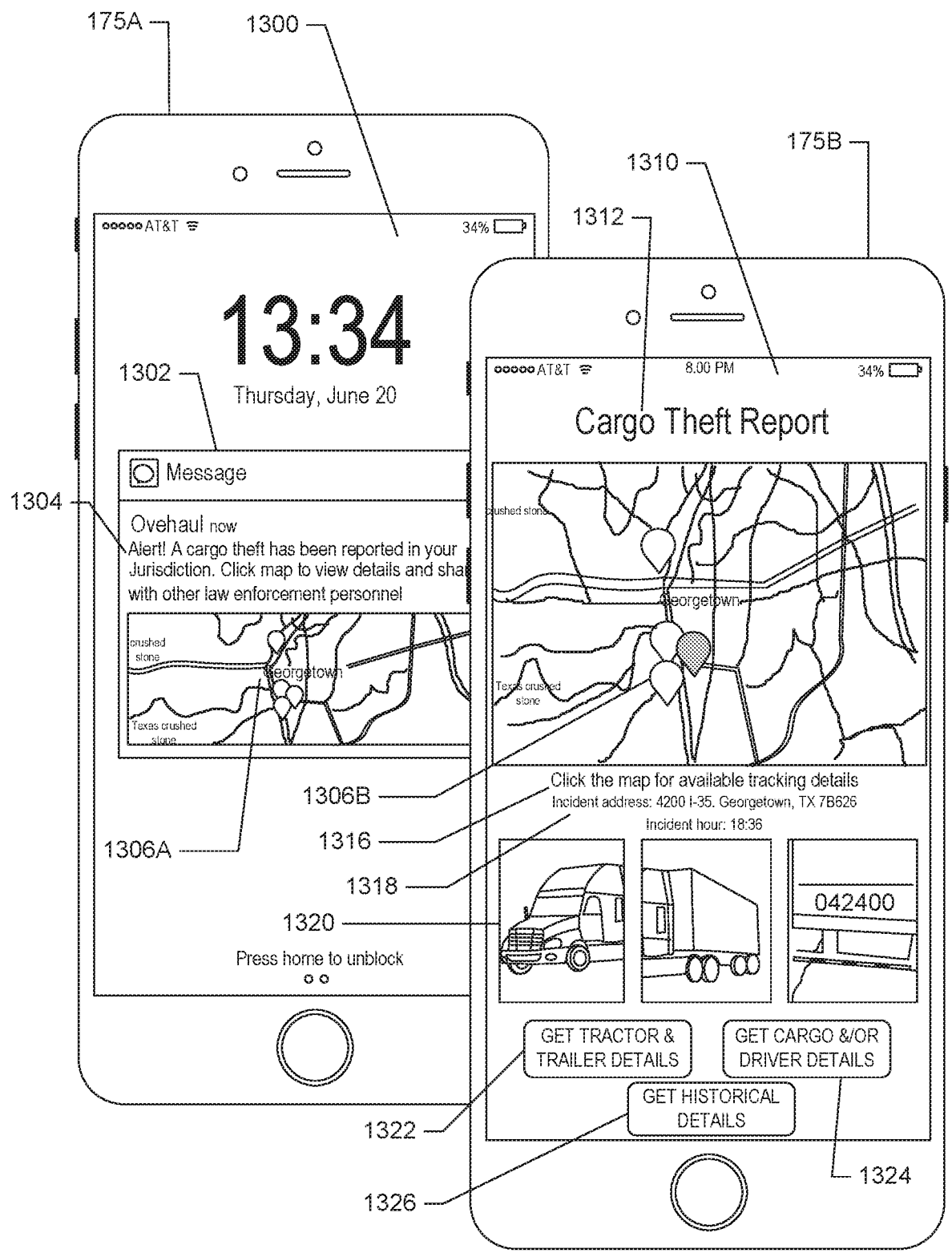
FIG. 13 illustrates two examples of user interfaces presented on a LE field device with location data and identification data of a stolen truck to enable more efficient assimilation of search information and a more informed response by LE personnel, according to one or more embodiments.

FIG. 13 provides two associated UIs 1300, 1310 displayed on display 1348. First UI 1300 is generated by LETR utility 275 as an initial presentation of information related to a received security event notification. First UI 1310 provides alert message 1304 that populates a section of display 1348 and provides initial information 1305 describing the occurrence of a security event (e.g., a cargo theft) that occurred in the general location or jurisdiction of the associated LE personnel. Alert message 1304 also includes a condensed geographic map 1306 that provides a general location of the security event. Notably, the information 1305 also includes an invitation to the LE personnel to click on the map (or the message) to view the descriptive details of the event and/or to share the details with other LE personnel who may not have received the alert message.

Selection of the map or message triggers the opening of second UI 1310. Second UI 1310 presents additional details of the security event including a title/tag 1312 clearly describing a type of event, an expanded geographic map 1306B on which shipment tracking dots are presented, security event details 1318, including an actual address (location) and a time at which the incident occurred, and a series of distinguishing details 1320 providing more specific details associated with the shipment. Additionally, second UI 1310 provides a prompt 1316 for the LE personnel to access available tracking details for the shipment-related entities by clicking on the shipment. This selection operates similar to the selection of a shipment from within the SLTSU UI, as described above, to present a zoned-in geographic image of the relative location of the dots representing each of the shipment-related entities.

As presented in second UI 1310, distinguishing data 1318 includes a picture of the tractor, a picture of the trailer, and a picture of the trailer tag (located on a rear or side of the trailer). Additionally, second UI 1310 presents LE personnel with a series of selectable options to obtain additional distinguishing details associated with the shipment. As shown, LE personnel is presented with selectable options, including first option 1322 to obtain tractor and trailer details, second option 1324 to obtain cargo and driver details, and third option 1326 to obtain historical information about security events occurring in the location. It is appreciated that additional or other types of distinguishing details can be retrieved by LE personnel, and the presentation of specific options for specific details is only provided as one example, and not intended to be limiting on the disclosure.

With reference to FIG. 14, selection by LE personnel of one of the available options for additional distinguishing details, triggers a retrieval of the specific type of distinguishing detail and a presentation of that retrieved distinguishing detail on display device 1248. FIGS. 14A and 14B respectively provide an enlarged color photograph of truck 246 and an enlarged color photograph of trailer 248, in response to selection of first option 1322 to get tractor and trailer details.

FIG. 14E then presents a summary of the full identifying details for tractor trailer combination including the vehicle identification number (VIN), model number and other distinguishing details about tractor-trailer. Each of the different retrieved distinguishing detail can be presented one at a time on display 1248 as a scrolling sequence of distinguishing details or presented as thumbnails that expand when selected by LE personnel. Accordingly LE personnel is provided access to significantly more data than would normally be available about a reported theft or other security event.

FIGS. 14C and 14D provides a colored photograph of the lock placed on the shipment (the trailer or cargo) and a copy of the bill of laden in response to selection of second option 1324 to get additional descriptive details about cargo. A driver's license or recent photograph of driver/operator would also be presented via second option 1324 or via drill down into second option 1324 in response to a request to get additional identifying/distinguishing details of/about the driver.

Figure 15:
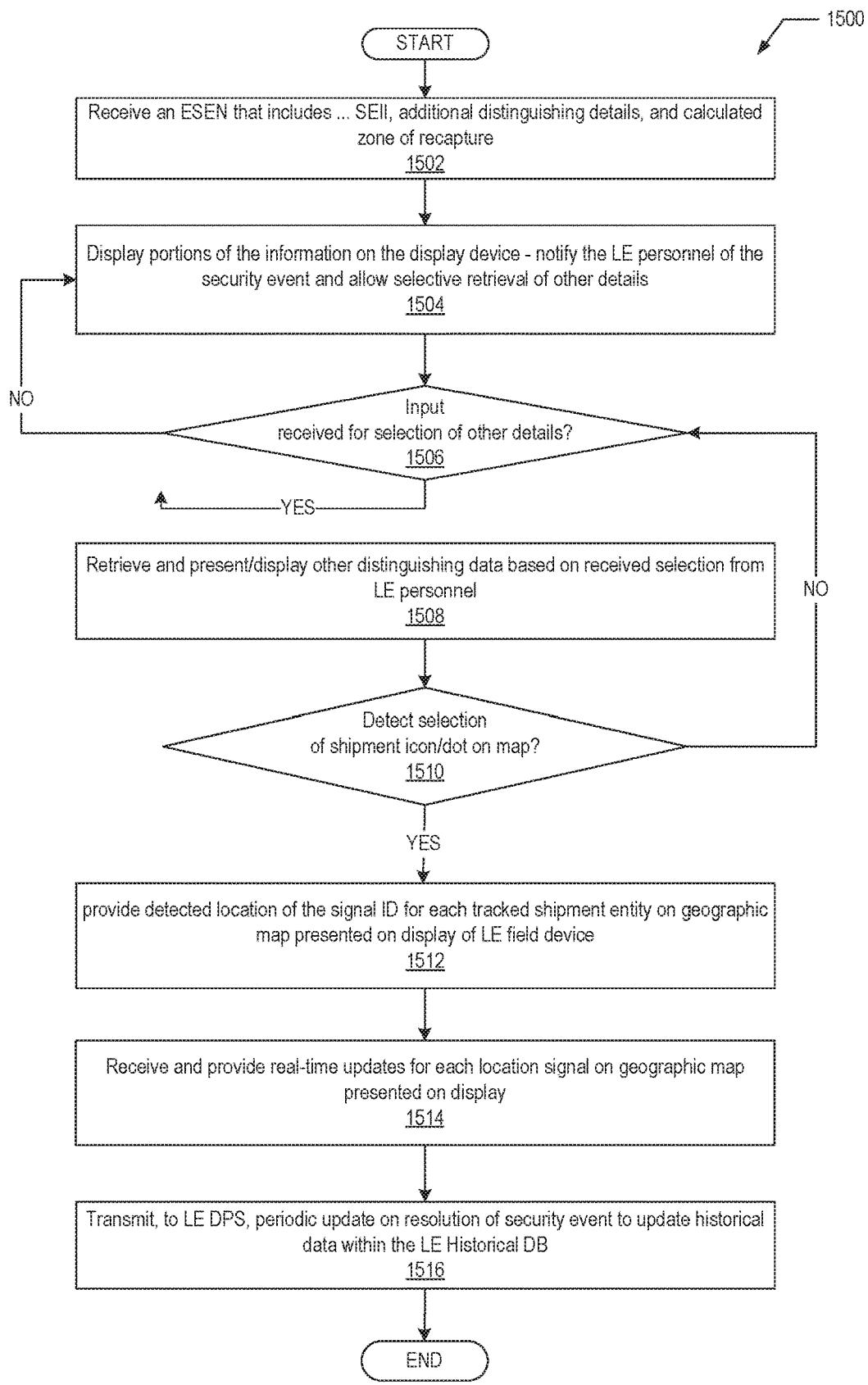
FIG. 15 provides a flow chart illustrating a method by which a LE field device responds to receipt of an ESEN with distinguishing details, in accordance with one or more embodiments.

FIG. 15 presents a method 1500 by which LE field device performs the various features that enables more accurate identification of and more effective recovery operations directed to shipment-related entities that are involved with a detected security event. In the illustrative embodiment in which method 1500 is implemented, the cargo and transport vehicle are equipped with one or more location sensors that generate signals that are tracked as a single shipment group on a shipment tracking DPS (e.g., 100) or operator MCD (e.g., 250). In one embodiment, the security event includes detecting a simultaneous loss of reception for the co-located signals, the simultaneous loss indicative of a localized signal jamming technique that is associated with attempts to steal at least one of the cargo and the transport vehicle. Method 1500 is performed by processor 1210 of LE field device 175 executing LETR utility 275, which configures the LE field device to perform the processes presented by method 1500.

Method 1500 begins at start block and transitions to block 1502 at which LE field device 250 receives, via the NI, from one of the LE dispatch server and an operator MCD to which the LE device is communicatively connected, information from an enhanced security event notification (ESEN) about a security event. The information includes: (i) security event identifying information (SEII), including a description of the security event, a location at which the security event occurred, and a time of occurrence of the security event; (ii) a calculated current zone of recapture; and (iii) additional distinguishing details. The information received from the ESEN enables a more effective search by selected LE personnel using specifically provided, higher-value, identifying information about a stolen item that is more likely to assist LE personnel with recovery of the stolen item. At block 1504, method 1500 includes configuring the LE field device to display portions of the information on the display device to notify the LE personnel of the security event and enable interfacing with the presented information. At decision block 1506, a check is made whether an input is received to open the notification and/or select other distinguishing details about the event. In response to receipt of the input within a security event notification UI on LE field device, method 1500 includes configuring the LE field device to selectively display within the UI other portions of the received information, including presenting additional details selected from the distinguishing details (block 1508). At decision block 1510, method includes LE field device detecting selection of a shipment tracking affordance (icon or dot) on the displayed map. In response to detecting the selection, method 1500 includes opening a second GUI (e.g., a close up mapping with additional shipment details) and displaying a location of each individual signal detected for each shipment entity (cargo, truck, trailer, driver MCD) on a geographic map (block 1512).

According to described embodiments, the cargo and transport vehicle are equipped with one or more location sensors, with the sensors generating co-located signals that are tracked on a shipment tracking system, as described herein. In one embodiment, the security event includes detecting a simultaneous loss of reception for the co-located signals, where the simultaneous loss is indicative of a localized signal jamming that is associated with attempts to steal at least one of the cargo and the transport vehicle. Thus, no tracking of the location signals is initially available to the LE field device 250 due to the signal jamming. In one embodiment, method includes determining if signal IDs have been received for the sensors of the shipment-related entities. The LE field device 250 may receive, within the ESEN, a signal identifier (ID) associated with each of the co-located signals. Assuming the signal IDs have been received, the method would then include monitoring for real-time identification of the signals return online and mapping the signals on the display of the LE field device to enable localized tracking of the signals at the LE field device when the signals come back online. Thus, method 1500 further includes enabling real-time updates to the relative locations of the individual signals within the second GUI on the LE field device (block 1514). At decision block 1515, method 1500 determines if security event has been resolved or partially resolved. In response to a partial of final resolution of security event, method 1500 includes periodically transmitting to LE DPS 171 updates regarding a resolution status of the security event (block 1516). Notably, in one embodiment, LE personnel is prompted to enter a final resolution of the security event or indicate when LE personnel is not longer working on the security event. Once the status information is entered and submitted, the information related to the security event is removed from LE field device 175 to allow for receipt of a new security event notification and download/receipt of the new ESEN with corresponding distinguishing details.

Thus, with the various described features presented herein, and according to a first aspect of the disclosure, a method is provided for facilitating tracking and supporting efficient recovery of stolen shipments. In one embodiment, aspects of the disclosure provided a method for facilitating law enforcement notification and recovery of stolen vehicles and/or shipments. The method comprises receiving, by a monitoring server, signals from a plurality of shipment associated entities, including from a driver communication device; identifying that at least one signal indicates that a theft has occurred (or is occurring) to at least one of a shipment and/or carrier equipment transporting the shipment; and dynamically forwarding, to at least one law enforcement device, a plurality of distinguishing details that enables law enforcement personnel to more quickly receive the required distinguishing details corresponding to the shipment and/or carrier and to more quickly resolve the theft event.

In one embodiment, the method includes retrieving from a TCIS database, a series of distinguishing data related to the one or more of the driver, shipment, carrier equipment, and law enforcement historical data and compiling the retrieved data as the plurality of data that is transmitted to the law enforcement device. The method also includes geo-locating the LE personnel (or dispatch center) closest to a location of the theft event and forwarding the distinguishing data to the LE personnel closest to the location of the theft event. The distinguishing data can be, but is not limited to (i) a description of the carrier equipment, (ii) one or more pictures of the carrier equipment; (iii) identifying data associated with the carrier equipment, such as license plate number and VIN number, (iv) copy of the cargo manifest, (v) historical data associated with one or more of (a) the location of the theft event, (b) the type of cargo, (c) the type of carrier equipment, (d) an origination point of the cargo, and (e) a destination point of the cargo, etc.

In an alternate embodiment, the distinguishing data is stored and maintained in storage of the driver/operator mobile device (e.g., on a mobile device storage or Subscriber Identity Module (SIM) card) and is received at the LE field device and/or at the background TCIS server directly from the driver/operator device, concurrently with receipt of the notification or the confirmation of the theft event.

The disclosure automates and streamlines communications between a driver/operator and LE, and provides an exponentially faster way for LE personnel to gain access to real-time cargo theft data, including, in some embodiments, available real-time tracking information from sensors embedded on the stolen cargo. The LE personnel and LE dispatch center are connected to a real-time trackable signal and driver verification that the theft has occurred. According to one embodiment, the driver's/operator's MCD is configured to present to the driver a "My Freight has Been Stolen" button within the shipment tracking UI, as a unique way of confirming the theft. Selection of this first virtual button triggers the generation and display of a "Send to LE" option to enable the driver to directly send the information about the theft to the LE field device or to the LE dispatch center, based on the location of the theft and the present jurisdiction of the LE office.

The functionality described herein can be implemented in any system that includes a series of linked communication devices that can provide geo-location details and exchange other data such as identification data of a stolen vehicle (vehicle identification number and/or license plate number), pictures of stolen items for quick identification, current location of stolen items that are capable of being tracked with one or more tracking mechanisms, such as sensors. It is further instructive that the features described herein can also be applied to lost children who have been fitted with a location sensor, such as in their clothing or jewelry. The notification provided to law enforcement would then automatically include a picture of the child and personal details such as skin color, height, hair color, clothing being worn, etc., and parent information. This additional distinguishing information would be available to and presented to the LE personnel who responds to and/or opens the notification on his LE field device.

According to one embodiment, a multi jurisdictional texting communication service is implemented that links to law enforcement dispatchers across different jurisdictions. In this embodiment, the LETR application 275 is stored online and available for download into a mobile communication device of each LE personnel. The LETR application 275 can then provide a live track of assets to each LE personnel as the assets move across the geographic travel routes from one jurisdiction to another. In one embodiment, the LE field device 175 includes a selectable option to respond to selection by issuing a "be on the lookout for" (BOLO) notification communicated to multiple LE field devices (which can be across jurisdictions) within a geographic area surrounding the location of the security event.

As further described herein, implementation of the functional features of the disclosure described herein can involve use of a combination of hardware, firmware, as well as several software-level constructs (e.g., program code and/or program instructions and/or pseudo-code) that execute to provide a series of methods that present the different features and functions of the disclosure.

In the above description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The above description is an extended summary and therefore, should not to be taken in a limiting sense, and the scope of the present disclosure will be defined by appended claims and equivalents thereof.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the invention not be limited to the particular embodiments disclosed for carrying out the disclosure, but that the disclosure will include all embodiments falling within the scope of any appended claims. Moreover, the use of the terms first, second, etc. do not denote any order or importance, but rather the terms first, second, etc. are used to distinguish one element from another.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A law enforcement (LE) data processing system (DPS) comprising:
    a memory having stored thereon a LE security event notification and dispatch (SEND) utility that enables the LE DPS to generate and forward an updated enhanced security event notification (ESEN) to one or more LE dispatch servers for forwarding to LE field devices of LE personnel;
    at least one network interface device (NID) by which the LE DPS receives and transmits information over one or more communication networks;
    at least one processor coupled to the memory and the at least one NID, and the at least one processor executing the SEND utility which configures the LE DPS to:
        receive, from a tracking system communicatively coupled to the LE DPS via the one more communication networks, an ESEN that includes information identifying a security event, a location at which the security event occurred, and additional distinguishing details corresponding to entities involved in and affected by the security event;
        selectively transmits information from the updated ESEN to at least one LE dispatch server supporting LE personnel within (i) a geographic vicinity of the location of the security event and (ii) a calculated current zone of recapture, the additional distinguishing details, geographic vicinity, and calculated zone of recapture enabling the LE personnel to receive a more complete set of relevant details at a LE field device that enables more accurate identification, tracking, and resolution by the LE personnel of the security event.

2. The LE DPS of claim 1, wherein the security event involves theft of at least one of a cargo and a transport vehicle associated with a shipment of the cargo, the cargo and transport vehicle being tracked by one or more location sensors, and the distinguishing details of the ESEN comprises shipment-related information, the SEND utility further enabling the LE DPS to:
    retrieve the distinguishing details from the received ESEN;
    identify a geographic location of the security event;
    select one or more LE dispatch servers communicative connected to LE field devices of LE personnel whose current location is proximate to or within the calculated current zone of recapture to the geographic location; and
    embed, within the information to be transmitted by the LE dispatch server to the LED field device of the one or more LE personnel, (i) the security event identifying information (SEII), including a description of the security event, the location at which the security event occurred and a time of occurrence of the security event, (ii) the calculated current zone of recapture, and (iii) additional distinguishing details providing descriptive data about one or more of the shipment, the cargo, the transport vehicle, the driver, the geographic location, and other data that facilitates more effective search and recovery operations by the LE personnel of the cargo and the vehicle.

3. The LE DPS of claim 2, wherein the SEND utility further enables the LE DPS to:
    store the information within a repository accessible by the LE DPS;
    associate an event tag with the stored information;
    forward the event tag and SEII to at least one selected LE field device;
    in response to receiving a signal indicating selection of the event tag at one of the at least one selected LE field device, retrieve and forward, to a corresponding LE field device, the additional distinguishing details associated with the security event and the shipment.

4. The LE DPS of claim 2, wherein the SEND utility configures the LE DPS to:
    store the additional distinguishing details within a repository accessible by the LE DPS, the additional distinguishing details tagged with an event identification; and
    automatically forwarding the additional distinguishing details along with the event identification to the LE field device, wherein transmitting the ESEN of the theft to the LE personnel provides the LE personnel with real-time, relevant information associated with the shipment to speed up search and recovery operations by the LE personnel.

5. The LE DPS of claim 1, wherein the SEND utility further enables the LE DPS to:
    retrieve, form a database maintained in a LE repository, historical data of similar security events and of other events occurring within a same geographic location;
    perform heuristic evaluation of the historical data and the security event to predict possible actions likely to occur based on the occurrence of the security event and patterns within the historical data;
    transmit a result of the heuristic evaluation along with the information to the LE field device;
    monitor for interim and final resolution of the security event by LE personnel;
    update the historical data with new data corresponding to the security event and the resolution; and
    store updated historical data within the LE repository.

6. The LE DPS of claim 1, wherein the ESEN and the additional distinguishing details comprises:
    a description of a trigger event that resulted in the security event;

shipment data related to one or more of a cargo, a transport vehicle, a driver, a shipment origination point, a shipment destination point, a shipper, and a receiving entity;

picture images of one or more of the cargo, the transport vehicle, a locking mechanism placed on a trailer of the transport vehicle, a shipping manifest or bill of laden for the cargo; and a plurality of other relevant details from among a group comprising: a type of cargo; a description of the transport vehicle; identifying data associated with the transport vehicle, including at least one of a license plate number and a vehicle identification (VIN) number; historical data associated with one or more of the geographic location of the trigger event.

7. The LE DPS of claim 2, wherein:

the cargo and transport vehicle are equipped with one or more location sensors, the sensors generating co-located signals that are tracked on a shipment tracking device of the tracking system;

the security event comprises detecting a simultaneous loss of reception for the co-located signals, the simultaneous loss indicative of a localized signal jamming technique that is associated with attempts to steal at least one of the cargo and the transport vehicle; and the SEND utility configures the LE DPS to: receive, within the ESEN, a signal identifier (ID) associated with each of the co-located signals; and transmit the signal ID to the LE field device to enable localized tracking of the signals at the LE field device when the signals come back online.

8. A method for providing enhanced notification of security events via a law enforcement (LE) data processing system (DPS), the method comprising:

receiving, from a tracking system that is communicatively coupled to the LE DPS via one more communication networks, an enhanced security event notification (ESEN) that includes information identifying a security event, a location at which the security event occurred, and additional distinguishing details corresponding to entities involved in and affected by the security event; and selectively transmitting information from the ESEN to at least one LEC field device of an LE personnel within (i) a geographic vicinity of the location of the security event and (ii) a calculated zone of recapture, the additional distinguishing details, geographic vicinity, and calculated zone of recapture enabling LE personnel to receive a more complete set of relevant details at the LE field device that enables more accurate identification, tracking, and resolution by the LE personnel of the security event.

9. The method of claim 8, wherein the security event involves theft of at least one of a cargo and a transport vehicle associated with a shipment of the cargo, the cargo and transport vehicle being tracked by one or more location sensors, and the distinguishing details of the ESEN comprises shipment-related information, the method further comprising:

retrieving the distinguishing details from the received ESEN;

identifying a geographic location of the security event;

selecting one or more LE personnel whose current location is proximate to or within a calculated current zone of recapture to the geographic location; and embedding, within the information transmitted to the LED field device of the one or more LE personnel, (i) the security event identifying information (SEII), including a description of the security event, the location at which the security event occurred and a time of occurrence of the security event, (ii) the calculated current zone of recapture, and (iii) additional distinguishing details providing descriptive data about one or more of the shipment, the cargo, the transport vehicle, the driver, the geographic location, and other data that facilitates more effective search and recovery operations by the LE personnel of the cargo and the vehicle.

10. The method of claim 8, wherein:

the cargo and transport vehicle are equipped with one or more location sensors, the sensors generating co-located signals that are tracked on a shipment tracking device of the tracking system;

the security event comprises detecting a simultaneous loss of reception for the co-located signals, the simultaneous loss indicative of a localized signal jamming technique that is associated with attempts to steal at least one of the cargo and the transport vehicle; and the method further comprises:

receiving, within the ESEN, a signal identifier (ID) associated with each of the co-located signals; and transmitting the signal ID to the LE field device to enable localized tracking of the signals at the LE field device when the signals come back online.

11. A law enforcement (LE) field device comprising:

a memory having stored thereon a LE Theft Response (LETR) utility;

a network interface (NI) that enables exchange of communication between the LE field device and a LE connect (LEC) network having a LE DPS associated therewith;

a display device utilized to present a graphical user interface displaying notifications of security events and security event information, including distinguishing details;

at least one input device that enables entry of a selection or information by a LE personnel; and a processor communicatively connected to the memory, the NI, the display device, and the at least one input device, the processor executing code of the LETR utility, which configures the LE field device to:

receive, via the NI, from the LE DPS, information from an enhanced security event notification (ESEN) about a security event, the information comprising: (i) security event identifying information (SEII), including a description of the security event, a location at which the security event occurred and a time of occurrence of the security event, (ii) a calculated current zone of recapture, and (iii) additional distinguishing details, wherein the information from the ESEN enables a more effective search by selected LE personnel using specifically provided, higher-value, identifying information about a stolen item that is more likely to assist LE personnel with recovery of stolen item;

display portions of the information on the display device to notify the LE personnel of the security event; and selectively display other portions of the information, based on input received via the at least one input device, and retrieve and present, on the display device, additional details from the distinguishing details selected from within the information.

12. The LE field device of claim 11, wherein:
- the cargo and transport vehicle are equipped with one or more location sensors, the sensors generating co-located signals that are tracked on a shipment tracking device of the tracking system;
- the security event comprises detecting a simultaneous loss of reception for the co-located signals, the simultaneous loss indicative of a localized signal jamming technique that is associated with attempts to steal at least one of the cargo and the transport vehicle; and
- the LE SEN utility further configures the LE field device to:
  - receive, within the ESEN, a signal identifier (ID) associated with each of the co-located signals;
  - transmit the signal ID to the LE field device to enable localized tracking of the signals at the LE field device when the signals come back online; and
  - provide and map, on the display of the LE field device, real-time updates of a detected location of the signal ID.

13. The LE field device of claim 12, wherein the LE SEN utility further configures the LE field device to: receive an input of a resolution status of the security event; and forward the input of the resolution status to the LE DPS.

14. A method for operating a law enforcement (LE) field device, the method comprising:
- receiving, at a network interface of the LE field device, from one of a LE dispatch server and an operator mobile communication device (MCD) to which the LE device is communicatively connected, information about a security event, the information comprising: (i) security event identifying information (SEII), including a description of the security event, a location at which the security event occurred, a time of occurrence of the security event, (ii) a calculated zone of recapture, and (iii) additional distinguishing details providing descriptive data about one or more of a cargo, a transport vehicle, a driver, an origination point, a destination, an owner of the cargo, the geographic location, and other data that enables faster recovery of the shipment by the LE personnel, wherein the information from the enhanced notification enables a more effective search by selected LE personnel using specifically provided, higher-value, identifying information about a stolen item that is more likely to assist LE personnel with recovery of the stolen item;
- displaying portions of the information on the display device to notify the LE personnel of the security event; and
- selectively displaying other portions of the information, based on input received via the at least one input device, and retrieving and presenting, on the display of the LE field device, additional details from the distinguishing details selected from within the information.

15. A method for facilitating law enforcement notification about and recovery of stolen items, the method comprising:
- a shipment tracking data processing system (DPS) receiving communication from a plurality of shipment associated entities, including from a driver mobile communication device (MCD);
- identifying that at least one received communication indicates an occurrence of a theft associated with at least one of a cargo and a transport vehicle of the shipment; and
- dynamically forwarding, to at least one law enforcement (LE) device located proximate to a calculated current zone of recapture, a plurality of distinguishing details about the shipment and the calculated current zone of recapture that enable LE personnel to more quickly identify the cargo and the transport vehicle and to enable more accurate identification, tracking, and more effective search and recovery operations by the LE personnel of the cargo and the vehicle.

16. The method of claim 13, wherein the signal is a confirmation signal from a driver mobile communication device (MCD) that indicates that the theft event has occurred.

17. The method of claim 16, wherein the signal further includes distinguishing details about the cargo and shipment that is maintained at and retrieved from non-volatile storage at the MCD.

18. A mobile communication device (MCD) comprising:
- a memory having stored thereon a location signal tracking utility;
- a network interface (NI) that enables exchange of communication between the MCD and a communication network on which a shipment tracking data processing system is communicatively connected;
- a display device utilized to present a graphical user interface displaying shipment data and notifications;
- at least one input device that enables entry, by a user of the MCD, of a user selection and of shipment identifying information and distinguishing details; and
- a processor communicatively connected to the memory, the NI, the display device, and the at least one input device, the processor executing code of the location signal tracking utility, which configures the MCD to:
  - monitor a geographic location of a plurality of signals associated with a cargo and a transport vehicle carrying the cargo;
  - determine from a current state of the plurality of signals when a security event has occurred;
  - generate and display a selectable confirmation object requesting user confirmation of an occurrence of the security event; and
  - in response to receipt of a user selection of the confirmation object, generating and transmitting a confirmation signal to at least the shipment tracking DPS, which is configured to respond to receipt of the confirmation signal by generating and transmitting an enhanced security event notification (ESEN) that includes a calculated current zone of recapture to a law enforcement (LE) DPS.

19. The MCD of claim 18, wherein distinguishing data is maintained in non-volatile storage of the MCD and the location signal tracking utility transmits the distinguishing details along with the confirmation signal to the shipment tracking DPS, which embeds the distinguishing data within the ESEN transmitted to the LE DPS.

20. A method for providing relevant tracking information for a shipment-related theft event, the method comprising:
- identifying, by a processor of a shipment tracking device, an occurrence of a security event involving a shipment of a cargo being transported by a transport vehicle, the cargo and transport vehicle being tracked by co-located signals from respective location sensors;
- prompting for extrinsic confirmation that the security event has occurred; and
- in response to receiving extrinsic confirmation that the security event has occurred:
  - retrieving distinguishing details related to the shipment;
  - generating a confirmation signal and linking the distinguishing detail to the confirmation signal;

transmitting the confirmation signal along with the distinguishing detail to a shipment tracking DPS, the distinguishing detail being utilized by the shipment tracking DPS to generate an enhanced security event notification (ESEN) that includes a calculated current zone of recapture and is transmitted to a law enforcement (LE) DPS for dispatch to LE field devices.

21. The method of claim 20, further comprising:
in response to receipt of an acknowledgement signal from the shipment tracking DPS, generating and displaying a confirmation notice that the ESEN has been dispatched to law enforcement.

22. The method of claim 21, further comprising:
enabling user input and capture of specific distinguishing details comprising one or more of a vehicle identification (VIN) number, vehicle tag numbers, a location where the vehicle was stolen, a tracking ID for the vehicle, and owner and/or driver details for the transport vehicle, including a driver's license number, address, and the driver's mobile device number, and one or more pictures of the cargo, the transport vehicle, the driver, and the driver's license, wherein the distinguishing details comprises one or more pictures and information associated with the cargo, the transport vehicle, and a driver, and the theft event; and
storing the distinguishing details within a non-volatile storage of the shipment tracker device.

23. The method of claim 20, further comprising:
establishing a direct communication link with the LE DPS to enable LE personnel to communicate and exchange relevant information with the driver; and
transmitting the confirmation signal along with the distinguishing detail and the calculated current zone of recapture directly to the LE DPS for dispatch to LE field devices.

* * * * *